(12) United States Patent
Kohda et al.

(10) Patent No.: US 9,294,329 B2
(45) Date of Patent: Mar. 22, 2016

(54) EMPHASIZED SIGNAL POINT ARRANGEMENT OPERATION FOR COMPENSATING DC IMBALANCE

(71) Applicant: GLOBALFOUNDRIES INC., Grand Cayman (KY)

(72) Inventors: Yasuteru Kohda, Yamato (JP); Kohji Takano, Nakano (JP)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/514,592

(22) Filed: Oct. 15, 2014

(65) Prior Publication Data

US 2015/0110218 A1  Apr. 23, 2015

(30) Foreign Application Priority Data

Oct. 17, 2013  (JP) .................................. 2013-216095

(51) Int. Cl.
| | |
|---|---|
| *H04K 1/02* | (2006.01) |
| *H04L 25/03* | (2006.01) |
| *H04L 25/49* | (2006.01) |
| *H04L 27/36* | (2006.01) |

(52) U.S. Cl.
CPC .................................. *H04L 27/368* (2013.01)

(58) Field of Classification Search
CPC ............... H03F 1/3247; H03F 1/3294; H03F 2201/3233; H04L 27/368; H04L 25/03343; H04L 27/34; H04L 27/362; H04L 1/0071; H04L 25/03834; H04L 1/0041
USPC ......... 375/219–223, 257–261, 264, 285–290, 375/295–298, 316–352
See application file for complete search history.

(56) References Cited

U.S. PATENT DOCUMENTS 6,674,768 B1 *  1/2004  Okamura ....................... 370/468
8,306,166 B1 * 11/2012  Fox .......................... H04L 27/38
                                                                375/222

(Continued)

FOREIGN PATENT DOCUMENTS

| JP | 08139766 A | 5/1996 |
|---|---|---|
| JP | 08335895 A | 12/1996 |

(Continued)

OTHER PUBLICATIONS

Aviran, et. al, "An Improvement to the Bit Stuffing Algorithm", IEEE Trans. Inform. Theory, vol. 51, pp. 2885-2891, 2004.

(Continued)

*Primary Examiner* — James M Perez
(74) *Attorney, Agent, or Firm* — Scully, Scott, Murphy & Presser, P.C.

(57) ABSTRACT

A transmission apparatus configured to communicate with a reception apparatus. The transmission apparatus comprising a monitoring unit, a symbol-specifying unit, a signal point moving unit, and a transmission unit. The monitoring unit monitors a total amount of deviations of signal levels in signals forming transmission symbol strings. The symbol specifying unit specifies target symbols from the transmission symbol strings based on the total amount of deviations of the signal levels. The signal level is at an outermost position on an opposite side of a plurality of deviations of the signal levels. The signal point moving unit moves positions of signal points of the target symbols outward. The transmission unit transmits a signal forming a transmission symbol string including the symbols, in which the positions of the signal points are moved, to the reception apparatus.

16 Claims, 14 Drawing Sheets

(56) References Cited

U.S. PATENT DOCUMENTS

| | | | |
|---|---|---|---|
| 8,422,579 B1 * | 4/2013 | Morais | 375/261 |
| 8,675,769 B1 * | 3/2014 | Eliaz | H04L 25/03178 375/135 |
| 2006/0154622 A1 * | 7/2006 | Piirainen | H03F 1/0205 455/115.1 |
| 2010/0272195 A1 * | 10/2010 | Rao | H04L 27/3411 375/260 |
| 2013/0127558 A1 * | 5/2013 | Clevorn | H04L 27/3411 332/183 |
| 2014/0294051 A1 | 10/2014 | Kohda et al. | |

FOREIGN PATENT DOCUMENTS

| | | |
|---|---|---|
| JP | 2000232399 A | 8/2000 |
| JP | 2004214722 A | 7/2004 |
| JP | 2004242258 A | 8/2004 |
| JP | 2013216095 A | 10/2013 |

OTHER PUBLICATIONS

Fraenkel, et. al, "Robust Universal Complete Codes for Transmission and Compression", Discrete Applied Mathematics, vol. 64, pp. 31-55, 1996.

* cited by examiner

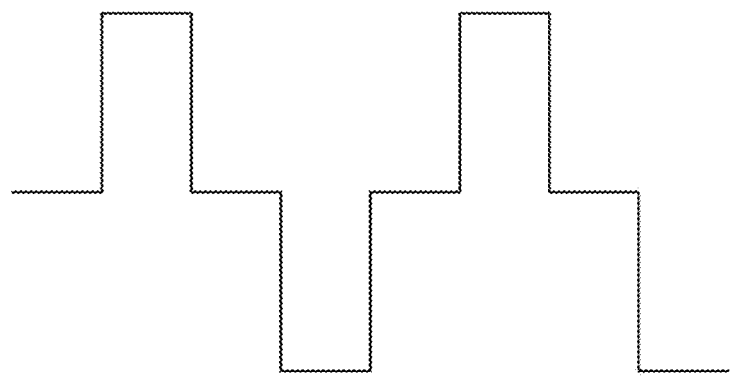
FIG. 12A    BASEBAND SIGNAL WAVEFORM BEFORE CORRECTION
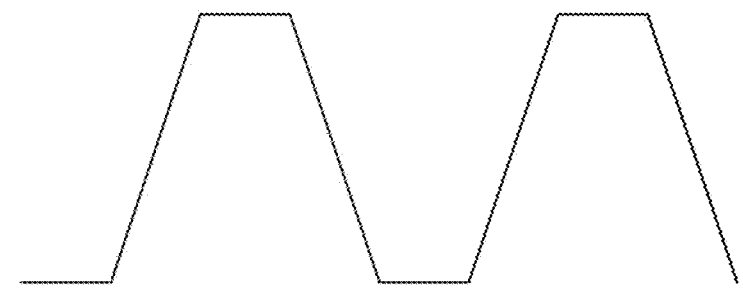
FIG. 12B    COMPENSATION VALUE (AMOUNT OF DEVIATION)
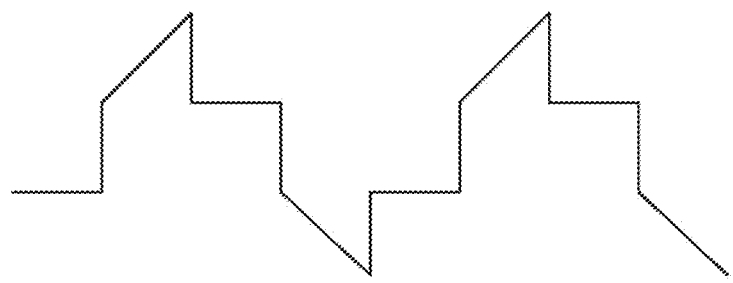
FIG. 12C    BASEBAND SIGNAL WAVEFORM AFTER CORRECTION
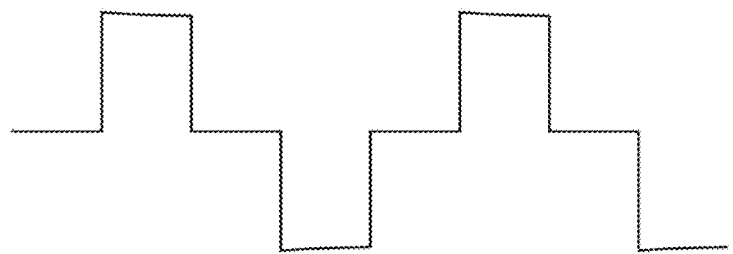
FIG. 12D    BASEBAND SIGNAL WAVEFORM OBSERVED ON RECEPTION SIDE

EMPHASIZED SIGNAL POINT ARRANGEMENT OPERATION FOR COMPENSATING DC IMBALANCE

BACKGROUND OF THE INVENTION

The present invention relates generally to the field of wireless communication, and more particularly to data transmission.

In recent years, the demand for speeding up the wireless communication is increasing to achieve real-time transmission and reception of rich content, such as moving images, and to achieve seamless connection with wired communication. To achieve such high-speed, high-capacity data communication, there are expectations for a millimeter-wave wireless communication technique that can achieve high-speed wireless communication at a data rate greater than Gbps.

A wireless communication apparatus typically includes a digital processing unit (baseband) that exclusively handles digital signal processing and an analog processing unit (RF: Radio Frequency) that exclusively handles analog signal processing. The circuit blocks are typically connected to each other through an alternating current (AC) coupling (capacitive coupling) to absorb a difference in input-output bias voltage and to achieve stable operation.

A direct current (DC) balance is necessary in the AC coupling, and accurate data transmission is difficult if many DC components or low-frequency components are included. Since a deviation of bits in a transmission signal generates DC offset components, preprocessing is typically applied by a scrambler or a data encoding technique to sufficiently diffuse transmission bits to avoid the deviation. Examples of the data encoding include a) 8b/10b encoding, b) bit stuffing as seen in, for example, S. Aviran, et. al, "An Improvement to the Bit Stuffing Algorithm", IEEE Trans. Inform. Theory, Vol. 51, pp 2885-2891, 2004, and c) Fibonacci coding, as seen in, for example, A. S. Fraenkel, et. al, "Robust Universal Complete Codes for Transmission and Compression", Discrete Applied Mathematics, vol. 64, pp 31-55, 1996.

However, additional bits are inserted in the data encoding technique, and in return, the encoding efficiency is reduced. Meanwhile, with just the scrambler, the bits are apparently uniformly dispersed, but a deviation may be generated as a result of the scrambling. More specifically, the scrambler may continuously generate the same bits in a short term, and stochastically, there is a bit deviation. A DC imbalance occurs in the short term, and this worsens the error rate.

If the signal is handled as a binary digital signal, the DC offset components may not be a problem. However, a modulation system, such as 16 Quadrature Amplitude Modulation (QAM), for modulating the amplitude is adopted in a high-speed communication technique, such as millimeter-wave communication, to further speed up the data rate, and the DC offset components have a non-negligible effect on multi-level determination in the amplitude direction. Furthermore, when signal determination boundaries are finer as in 64 QAM and the like, the effect of the DC offset components becomes greater.

SUMMARY

One or more embodiments of the present invention provide a method, system, and program product for implementing a transmission apparatus configured to communicate with a reception apparatus, the program product causing a programmable device to function as: a monitoring unit configured to monitor a total amount of deviations of signal levels in signals forming transmission symbol strings; a symbol specifying unit configured to specify target symbols, in which the signal level is at an outermost position on an opposite side of a plurality of deviations of the signal levels, from the transmission symbol strings based on the total amount of deviations of the signal levels; a signal point moving unit configured to move positions of signal points of the target symbols outward; and an output unit configured to output a signal forming a transmission symbol string including the symbols, in which the positions of the signal points are moved.

One or more embodiments of the present invention provide a communication system the communication system comprising: a reception apparatus and a transmission apparatus configured to communicate with the reception apparatus. The transmission apparatus comprising: a monitoring unit configured to monitor a total amount of deviations of signal levels in signals forming transmission symbol strings; a symbol specifying unit configured to specify target symbols, in which the signal level is at an outermost position on an opposite side of a plurality of deviations of the signal levels, from the transmission symbol strings based on the total amount of deviations of the signal levels; a signal point moving unit configured to move positions of signal points of the target symbols outward; and a transmission unit configured to transmit a signal forming a transmission symbol string including the symbols, in which the positions of the signal points are moved, to the reception apparatus. The reception apparatus comprising: a reception unit configured to receive the signal forming the transmission symbol string from the transmission apparatus; and a determination unit configured to determine the symbols from the signal based on predetermined determination boundaries.

One or more embodiments of the present invention provide a circuit apparatus including a circuit configured to generate a signal to be output to a subsequent stage through a coupling element, the circuit comprising: a monitoring unit configured to monitor a total amount of deviations of signal levels in signals forming transmission symbol strings; a symbol specifying unit configured to specify target symbols, in which the signal level is at an outermost position on an opposite side of a plurality of deviations of the signal levels, from the transmission symbol strings based on the total amount of deviations of the signal levels; a signal point moving unit configured to move positions of signal points of the target symbols outward; and an output unit configured to output a signal forming a transmission symbol string including the symbols, in which the positions of the signal points are moved, to the subsequent stage.

One or more embodiments of the present invention provide a communication method executed by a transmission apparatus configured to communicate with a reception apparatus, the communication method comprising the steps of: by the transmission apparatus, acquiring a total amount of deviations of signal levels in signals forming transmission symbol strings; by the transmission apparatus, specifying target symbols, in which the signal level is at an outermost position on an opposite side of a plurality of deviations of the signal levels, from the transmission symbol strings based on the total amount of deviations of the signal levels; by the transmission apparatus, moving positions of signal points of the target symbols outward; and by the transmission apparatus, transmitting a signal forming a transmission symbol string including the symbols, in which the positions of the signal points are moved, to the reception apparatus.

One or more embodiments of the present invention provide a transmission apparatus configured to communicate with a reception apparatus. The transmission apparatus comprising:

a monitoring unit configured to monitor a total amount of deviations of signal levels in signals forming transmission symbol strings; a symbol specifying unit configured to specify target symbols from the transmission symbol strings based on the total amount of deviations of the signal levels, wherein the signal level is at an outermost position on an opposite side of a plurality of deviations of the signal levels; a signal point moving unit configured to move positions of signal points of the target symbols outward; and a transmission unit configured to transmit a signal forming a transmission symbol string including the symbols, in which the positions of the signal points are moved, to the reception apparatus.

BRIEF DESCRIPTION OF THE SEVERAL VIEWS OF THE DRAWINGS

FIGS. 12A-12D are diagrams showing an offset compensation process on the transmission side, with signal waveforms, in accordance with an embodiment of the present invention.

DETAILED DESCRIPTION

Figure 1:
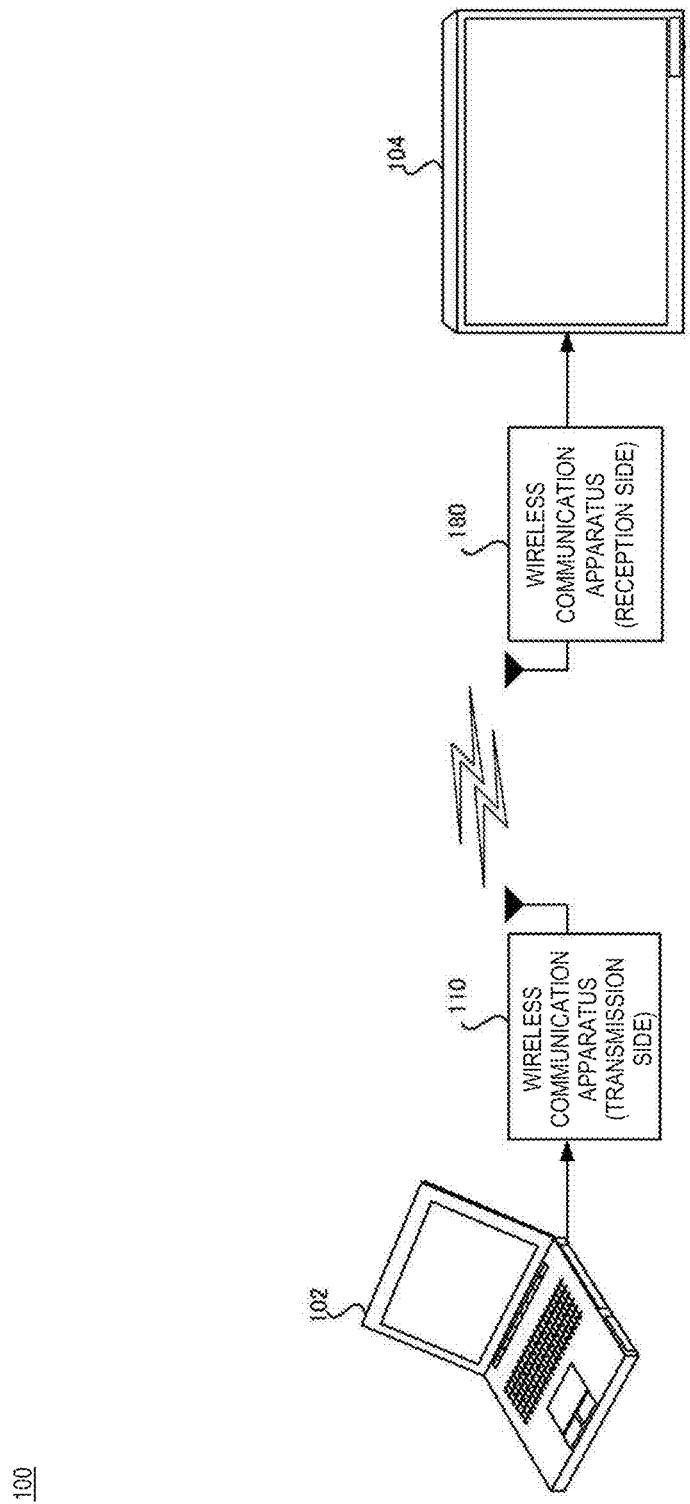
FIG. 1 is an outline diagram showing a wireless communication system, in accordance with an embodiment of the present invention.

Embodiments of the present invention provide a technique in which the additional bit insertion (such as in the data encoding technique) is not performed, but in which a transmission apparatus a) reduces deviations of signal levels that generate short-term direct current (DC) offsets or low-frequency components caused by alternating current (AC) coupling, and b) reduces generation of errors caused by DC offsets or the low-frequency components.

One embodiment of the present invention provides one or more of a transmission apparatus, a communication system, a circuit apparatus, a communication method, and a program that a) reduces deviations of signal levels that generate short-term DC offsets and low-frequency components caused by an AC coupling, and b) reduces generation of errors caused by the DC offsets and the low-frequency components.

One embodiment of the present invention provides a transmission apparatus that includes: a monitoring unit configured to monitor a total amount of deviations of signal levels in signals forming transmission symbol strings; a symbol specifying unit configured to specify target symbols, in which the signal level is at an outermost position on an opposite side of the deviations of the signal levels, from the transmission symbol strings based on the total amount of the deviations of the signal levels; a signal point moving unit configured to move positions of signal points of the target symbols outward; and a transmission unit configured to transmit a signal forming a transmission symbol string including the symbols, in which the positions of the signal points are moved, to the reception apparatus.

An embodiment of the present invention provides a circuit apparatus configured to generate a signal to be output to a subsequent stage through a coupling element. One embodiment of such a circuit apparatus includes: a monitoring unit configured to monitor a total amount of deviations of signal levels in signals forming transmission symbol strings; a symbol specifying unit configured to specify target symbols, in which the signal level is at an outermost position on an opposite side of the deviations of the signal levels, from the transmission symbol strings based on the total amount of the deviations of the signal levels; a signal point moving unit configured to move positions of signal points of the target symbols outward; and an output unit configured to output a signal forming a transmission symbol string including the symbols, in which the positions of the signal points are moved, to the subsequent stage.

An embodiment of the present invention provides a communication method executed by a transmission apparatus that is configured to communicate with a reception apparatus. One embodiment of such a communication method includes the steps of: by the transmission apparatus, acquiring a total amount of deviations of signal levels in signals forming transmission symbol strings; by the transmission apparatus, specifying target symbols, in which the signal level is at an outermost position on an opposite side of the deviations of the signal levels, from the transmission symbol strings based on the total amount of the deviations of the signal levels; by the transmission apparatus, moving positions of signal points of the target symbols outward; and by the transmission apparatus, transmitting a signal forming a transmission symbol string including the symbols, in which the positions of the signal points are moved, to the reception apparatus.

An embodiment of the present invention provides a communication system including the transmission apparatus and the reception apparatus. Furthermore, an embodiment of the present invention provides a program for implementing the transmission apparatus.

According to a configuration, an embodiment of the present invention provides one or both of a) a reduction in the deviations of the signal levels that generate short-term DC offsets and low-frequency components caused by the AC coupling, and b) a reduction in the generation of errors caused by the DC offsets and the low-frequency components.

Hereinafter, although the present invention will be described with specific embodiments, the present invention is not limited to the embodiments described below. In the embodiments described below, a wireless communication apparatus 110 and a wireless communication system 100 including the wireless communication apparatus 110 will be used to describe examples of a transmission apparatus and a communication system including the transmission apparatus, respectively. However, numerous modifications and substitutions can be made without deviating from the scope and spirit of the present invention. Therefore, the present invention has been disclosed by way of example and not limitation.

FIG. 1 is an outline diagram of the wireless communication system 100, in accordance with one embodiment of the present invention. The wireless communication system, 100, according to the present embodiment includes a first wireless communication apparatus 110 and a second wireless communication apparatus 180. The wireless communication apparatus 110 and the wireless communication apparatus 180 have the functionality to establish wireless communication by electromagnetic waves (millimeter waves) at, for example, a several dozen GHz frequency band to achieve data communication speed of several Gbps or more. The wireless communication apparatuses 110 and 180 have the functionality to perform data communication with partners from standpoints of both a transmitter and a receiver. However, for the sake of convenience and brevity of the description, the first wireless communication apparatus 110 is herein described as primarily a transmission side, and the second wireless communication apparatus 180 is herein described as primarily a reception side in the following description.

In this embodiment, wireless communication apparatus 110 places data to be transmitted on a frame to transmit the data to the wireless communication apparatus 180 of a communication partner. In the illustration of FIG. 1, a notebook personal computer 102 is connected to the wireless communication apparatus 110, and a display apparatus 104 is connected to the wireless communication apparatus 180. In the embodiment of the illustration, the wireless communication apparatus 110 includes the functionality to place content data, such as moving images input from the notebook personal computer 102, on a frame to transmit the content data to the wireless communication apparatus 180. The display apparatus 104 includes the functionality to acquire the content data through the wireless communication apparatus 180 to display the content on a screen.

Figure 2:
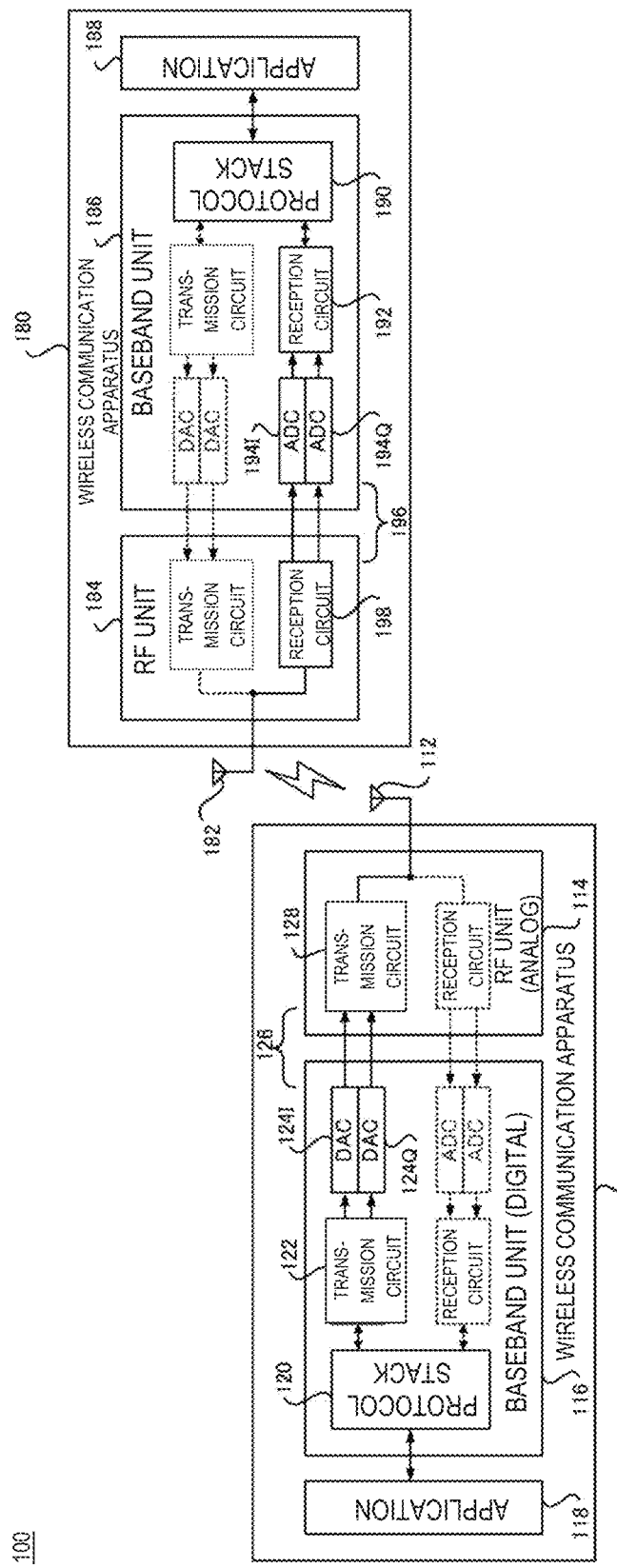
FIG. 2 is a block diagram showing functional configurations of wireless communication apparatuses in the wireless communication system, in accordance with an embodiment of the present invention.

FIG. 2 is a block diagram showing functional configurations of the wireless communication apparatuses 110 and 180 in the wireless communication system 100, in accordance with an embodiment of the present invention. The wireless communication apparatus 110 shown in FIG. 2 includes an antenna 112, a Radio Frequency (RF) unit 114 that handles analog processing, a baseband unit 116 that handles digital processing, and an application engine 118 of a subsequent stage. Similarly, the wireless communication apparatus 180 includes antenna 182, Radio Frequency (RF) unit 184, baseband unit 186, and application engine 188.

In one embodiment, during reception, antennas 112 and 182 receive electromagnetic waves propagated through the air to convert the electromagnetic waves to electrical signals and input the electrical signals to RF units 114 and 184. During transmission, antennas 112 and 182 convert electrical signals input from RF units 114 and 184 to electromagnetic waves and emit the electromagnetic waves to the air. RF units 114 and 184 are circuit blocks that process signals of wireless frequency bands of electromagnetic waves that are carrier waves. RF units 114 and 184 include transmission circuit 128 and reception circuit 198. During transmission, RF units 114 and 184 modulate input baseband signals to signals of radio frequency bands, and during reception, RF units 114 and 184 demodulate input signals of radio frequency bands to baseband signals.

In the illustrated embodiment, it should be noted that, in FIG. 2, components on a transmission channel are provided with reference numerals in wireless communication apparatus 110, and dotted lines without reference numerals indicate components that are not on the transmission channel. Similarly, opposite to the transmission side, dotted lines without reference numerals indicate components that are not on a reception channel in wireless communication apparatus 180.

In one embodiment, the baseband signal is a signal before modulation or after demodulation. In a case of a binary signal, the baseband signal is equivalent to a rectangular wave with signal levels expressing "0" and "1", and in a case of a multi-level signal, the baseband signal is equivalent to a signal wave in a rectangular shape with a plurality of signal levels expressing values (for example, four values of −3, −1, +1, and +3). RF units 114 and 184 multiply the baseband signal by a carrier wave and add the two waves together to generate a transmission signal.

In one embodiment, baseband units 116 and 186 are circuit blocks that process baseband signals before modulation or after demodulation. During transmission, baseband units 116 and 186 generate transmission baseband signals based on transmission data (bit strings) input from applications 118 and 188 of subsequent stages and output the transmission baseband signals to RF units 114 and 184. During reception, baseband units 116 and 186 restore reception data (bit strings) based on reception baseband signals demodulated by RF units 114 and 184 and output the reception data to applications 118 and 188 of subsequent stages.

More specifically, in this embodiment, baseband units 116 and 186 respectively include: protocol stack 120 or 190, transmission circuit 122, digital to analog converters (DACs) 124, reception circuit 192, and analog to digital converters (ADCs) 194. Protocol stack 120 and 190 respectively handle processing of a hierarchical communication protocol group, such as a physical layer, a data link layer, a network layer, and a transport layer.

In one embodiment, transmission circuit 122 modulates transmission data input from protocol stack 120 according to an adopted modulation system to generate transmission baseband data and outputs a transmission baseband signal to transmission circuit 128, of RF unit 114, through DACs 124. Reception circuit 192 acquires reception baseband data from a reception baseband signal and outputs the reception data to protocol stack 190. As part of such a reception, the baseband signal is demodulated by reception circuit 198, of RF unit 184, and passed through ADCs 194 to restore reception data according to the modulation system.

In the illustrated embodiment, and not by limitation, a quadrature amplitude modulation (QAM) system is utilized. As such, in the described embodiment, respective amplitude and phases of two carrier waves are modulated to transmit data. These two carrier waves, that is, an in-phase (I phase) carrier wave and a quadrature phase (Q phase) carrier wave, are in a quadrature phase relationship and are independent from each other.

In one embodiment, in association with the implementation of the modulation system, baseband signals (which are baseband data) include components of the I phase and the Q phase in the present embodiment, and channels of the I phase and the Q phase are provided with a DAC 124I for I phase, a DAC 124Q for Q phase, an ADC 194I for I phase, and an ADC 194Q for Q phase. The baseband signals (baseband data) of the I phase and the Q phase form symbol strings of transmission data, and signal levels of each time point designate signal points indicating symbols on a signal space diagram (e.g., on a Constellation Diagram).

In one embodiment, a modulation system is utilized. That is, a method of allocating codes to the symbols, and the like are determined in advance in wireless communication system 100, and wireless communication apparatuses 110 and 180 execute processes according to predetermined procedures. Although MQAM (M-ary QAM) is described as an example of a modulation system that can be suitably applied in the illustrated embodiment, embodiments are not limited to such a modulation system.

In one embodiment, RF units 114 and 184 and baseband units 116 and 186 are respectively connected to each other by AC couplings 126 and 196, further respectively. As described, since a DC balance of signal is utilized for AC coupling between circuit blocks, in the illustrated embodiment, a scrambler applies preprocessing, such as randomization of the bits of the transmission data in advance to prevent deviations of bits as much as possible.

In some scenarios, as a result of signal scrambling, deviation is generated stochastically based, in part on, whether the same signal level continues for a predetermined period or occurs frequently. In general, a deviation of the signal level breaks DC balance, generates a DC offset, and worsens error rates. Particularly, when a modulation system is adopted (for example, a QAM system, which sends out the information in the amplitude direction) the DC offset components have a non-negligible effect on the determination at the determination boundaries in the amplitude direction. Furthermore, with an increase in the speed of the data rate, the effect of a DC offset by the AC coupling increases.

In one embodiment, wireless communication system 100 is focused on the point where the effect of signal deviation on signal determination (on the reception side) is small, even if operation of moving signal points of symbols at outermost positions further outward on the signal space diagram is performed on the transmission side. In one such embodiment, the following configuration exists as described hereinafter. More specifically, on the transmission side, wireless communication system 100 executes signal processing for performing rearrangement operation of signal points of symbols to reduce the deviation when there is a deviation of signal level in the baseband signal. Wireless communication system 100, according to one such embodiment, executes signal processing by transforming an output waveform of a baseband signal on the transmission side to compensate the DC offset observed on the reception side. Hereinafter, details of the signal processing executed by such a wireless communication apparatus 110 on the transmission side will be described with reference to FIGS. 3 to 13.

Figure 3:
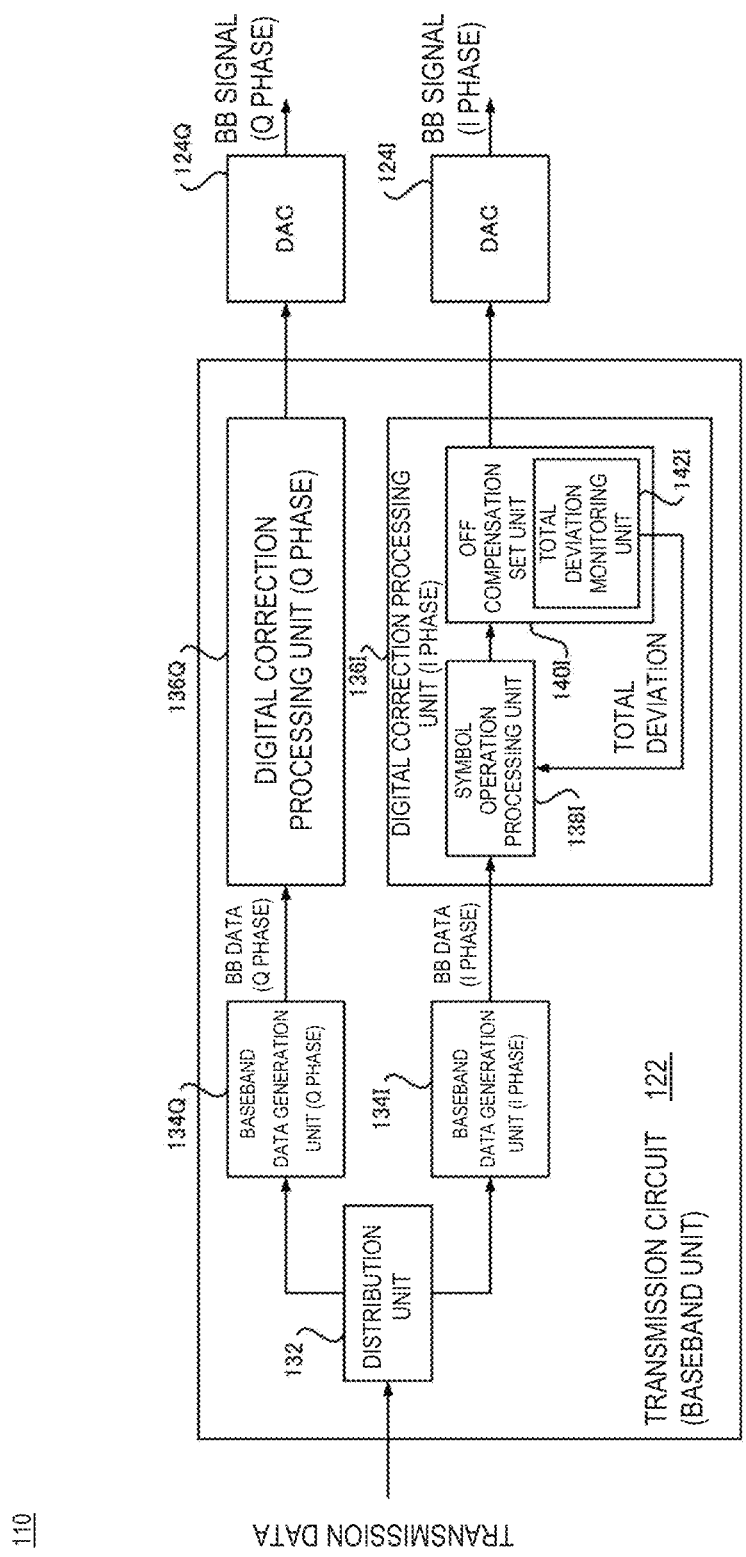
FIG. 3 is a detailed block diagram of a transmission circuit of a transmission-side baseband unit, in accordance with an embodiment of the present invention.
Figure 4:
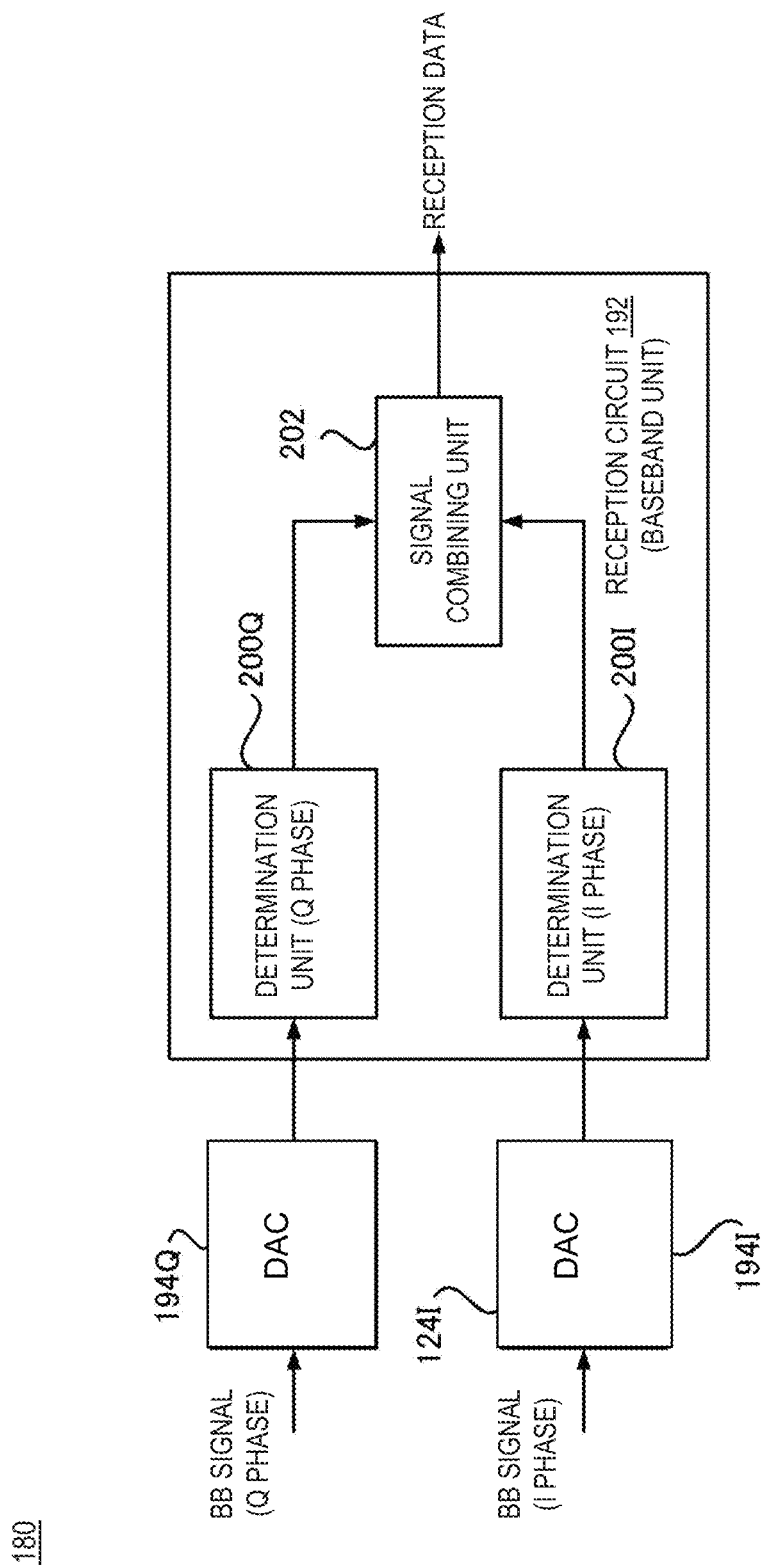
FIG. 4 is a detailed block diagram of a reception circuit of a reception-side baseband unit, in accordance with an embodiment of the present invention.

FIG. 3 shows a detailed block diagram of transmission circuit 122 on the transmission-side of baseband unit 116, as shown in FIG. 2, in accordance with an embodiment of the present invention. FIG. 4 shows a detailed block diagram of reception circuit 192 on the reception-side of baseband unit 186, in accordance with an embodiment of the present invention. It should be noted that FIGS. 3 and 4 show select elements of configurations related to the signal processing for performing the rearrangement operation of the signal points of the symbols, in accordance with one embodiment. As such, peripheral elements for error correction, filtering, synchronous detection, clock recovery, and the like are not illustrated.

In one embodiment, transmission circuit 122 on the transmission-side of baseband unit 116, shown in FIG. 3, includes distribution unit 132, baseband data generation units 134I and 134Q (of the I phase and the Q phase respectively), and digital correction processing units 136I and 136Q (of the I phase and the Q phase respectively).

In one embodiment, distribution unit 132 receives input of transmission data (bit strings) and distributes the transmission data to bit streams of the I phase and the Q phase. Baseband data generation units 134I and 134Q modulate the bit streams distributed from distribution unit 132 by a predetermined modulation system (amplitude-shift keying in QAM) to generate baseband data of the phases and output the baseband data to digital correction processing units 136I and 136Q. The digital correction processing units 136I and 136Q apply a correction process of the transmission side to the baseband data of the phases. The baseband data subjected to the digital correction process is input to the DACs 124I and 124Q, and baseband signals are output to the transmission circuit 128 of the RF unit 114 of a subsequent stage through the AC coupling 126. RF unit 144 adds the baseband signals to carrier waves and transmits them, via antenna 112, to wireless communication apparatus 180 on the reception side.

In one embodiment, reception circuit 192 on the reception-side of baseband unit 186, as shown in FIG. 4, includes determination units 200I and 200Q of the I phase and the Q phase, respectively, and signal combining unit 202. When signals from wireless communication apparatus 110 (on the transmission-side) are received, reception circuit 198 of RF unit 184 (of a preceding stage) inputs the baseband signals into the ADC 194I and 194Q of the phases via AC coupling 196. The ADC 194I and 194Q convert the baseband signals of the phases to baseband data and input the baseband data to determination units 200I and 200Q.

In one embodiment, determination units 200I and 200Q receive input of the baseband data digitalized by ADC 194I and 194Q and demodulate the baseband data to generate bit streams of the phases. Signal combining unit 202 receives input of the bit streams of both the I phase and the Q phase and reconstructs the reception data (e.g., bit strings).

Referring now to FIG. 3, FIG. 3 further shows detailed functional blocks of the digital correction processing unit 136I. More specifically, digital correction processing unit 136I includes symbol operation processing unit 138I and total deviation monitoring unit 142I. The detailed configuration of the channel of the Q phase is not illustrated in FIG. 3. However, note that a substantially similar configuration to that of the I phase is further provided for the channel of the Q phase.

In one embodiment, total deviation monitoring unit 142I monitors a total amount of deviations of signal levels of baseband signals from a reference time point and calculates an index value for evaluating the total amount of the deviations. In one embodiment, the index value of the total deviation is obtained by calculating, from a predetermined time point, an accumulated value of the signal levels (for example, −3, −1, +1, and +3 in the case of four values) designating the symbols in the baseband signal of a specific phase. In some cases, the reference time point is a start point of a transmission frame, and in that case, the index value of the total amount of the deviations is reset for each frame, in accordance with an embodiment of the present invention.

In one embodiment, the index value of the total deviation that is monitored by total deviation monitoring unit 142I is output to symbol operation processing unit 138I. In the embodiment illustrated in FIG. 3, total deviation monitoring unit 142I is included as a constituent element of an offset compensation unit 140I that carries out DC offset compensation of a baseband signal. Details of the DC offset compensation process by the offset compensation unit 140I are described below in at least the description of FIG. 9B.

In some scenarios, the deviations of the signal levels, which are monitored by total deviation monitoring unit 142I, break the DC balance of signals and generate variations (DC offsets) in the reference level of the reception baseband signals in the reception-side wireless communication apparatus 180. In some cases, the coupling existing between the wireless communication apparatuses 110 and 180 causes such deviations in signal levels. Such variations in the reference level often cause errors and negatively affect the execution transmission rate.

Figure 5:
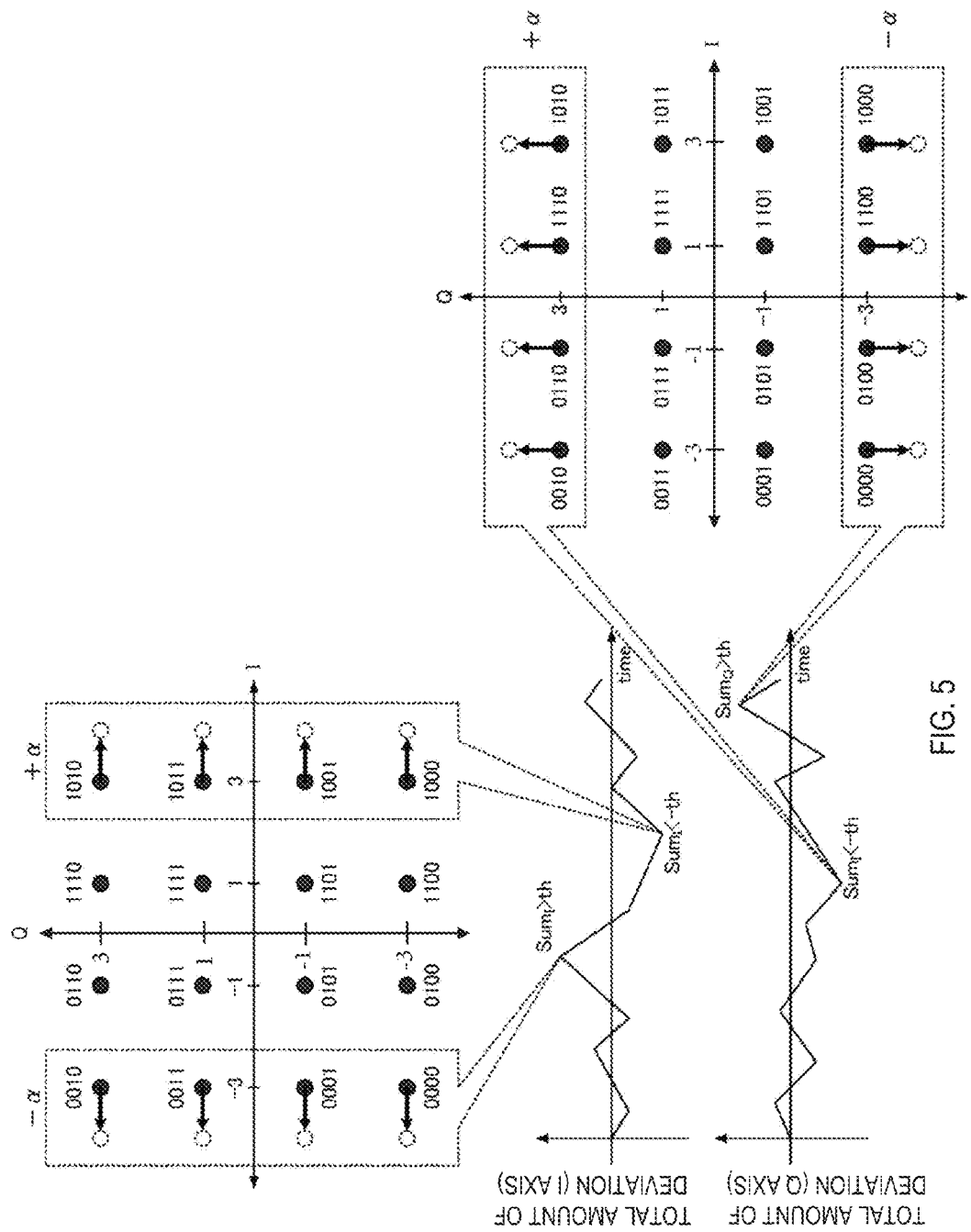
FIG. 5 is a diagram describing rearrangement operation of signal points of symbols performed according to a total deviation of signal levels in an I axis and a Q axis, in accordance with an embodiment of the present invention.

FIG. 5 is a diagram describing rearrangement operation of signal points of symbols performed according to a total deviation of signal levels in an I axis and a Q axis, in accordance with an embodiment of the present invention. Further, FIG. 5 describes the total amount of the deviations of the signal levels in the I axis and the Q axis and the signal point rearrangement operation of the symbols performed based on the total amount of the monitored deviations. In one embodiment, as shown in FIG. 5, based on the total amount of the deviations of the signal levels, symbol operation processing unit 138 executes signal point rearrangement operation of symbols to eliminate the deviations of the signal levels. In this embodiment, when the total amount of the deviations exceeds a reference in a corresponding specific axis, symbol operation processing unit 138 specifies, as target symbols, symbols in which the signal level is at the outermost position on the opposite side of the deviation of the signal level, that is, symbols that are in the opposite direction of the direction of the deviation and that have the maximum signal level, from the transmission symbol strings. Symbol operation processing unit 138 changes the signal level of the target symbols to move the target symbols to positions of signal points that further eliminate the deviations of the signal levels, that is, further outside positions, in the corresponding specific axis, in accordance with an embodiment of the present invention.

For example, with reference to FIG. 5, in relation to the I axis, if the deviations of the signal levels on the I axis are accumulated on the + side ($Sum_I$>th), then symbols that have the outermost signal level (−3) of the − side on the I axis in the symbol strings are specified as the target symbols. The signal level of the target symbols is changed to move the positions of the signal points further outward on the I axis (−α). Similarly, if the deviations of the signal levels on the I axis are accumulated on the − side ($Sum_I$<−th), then the positions of the signal points of the target symbols that have the outermost signal level (+3) on the + side in the I axis are moved further outward (+α). In this embodiment, although an amount of movement α is not particularly limited, a value in a range of 1% to 40% of the symbol-to-symbol distance on the IQ plane is used. In this embodiment, a similar value range applies to the Q axis.

Referring now to the embodiment shown in FIG. 3, symbol operation processing unit 138 and total deviation monitoring unit 142 handle the baseband data of a specific phase (I phase or Q phase) and are not necessarily concerned with the symbols designated in both of the I phase and the Q phase. Therefore, in one embodiment, the target symbols are independently specified for the baseband signals of the I phase and the Q phase, and the signal levels of the target symbols are changed. Total deviation monitoring unit 142 functions, in part, as a monitoring unit in the present embodiment, and symbol operation processing unit 138 functions, in part, as a symbol specifying unit and a signal point moving unit in the present embodiment.

Figure 6:
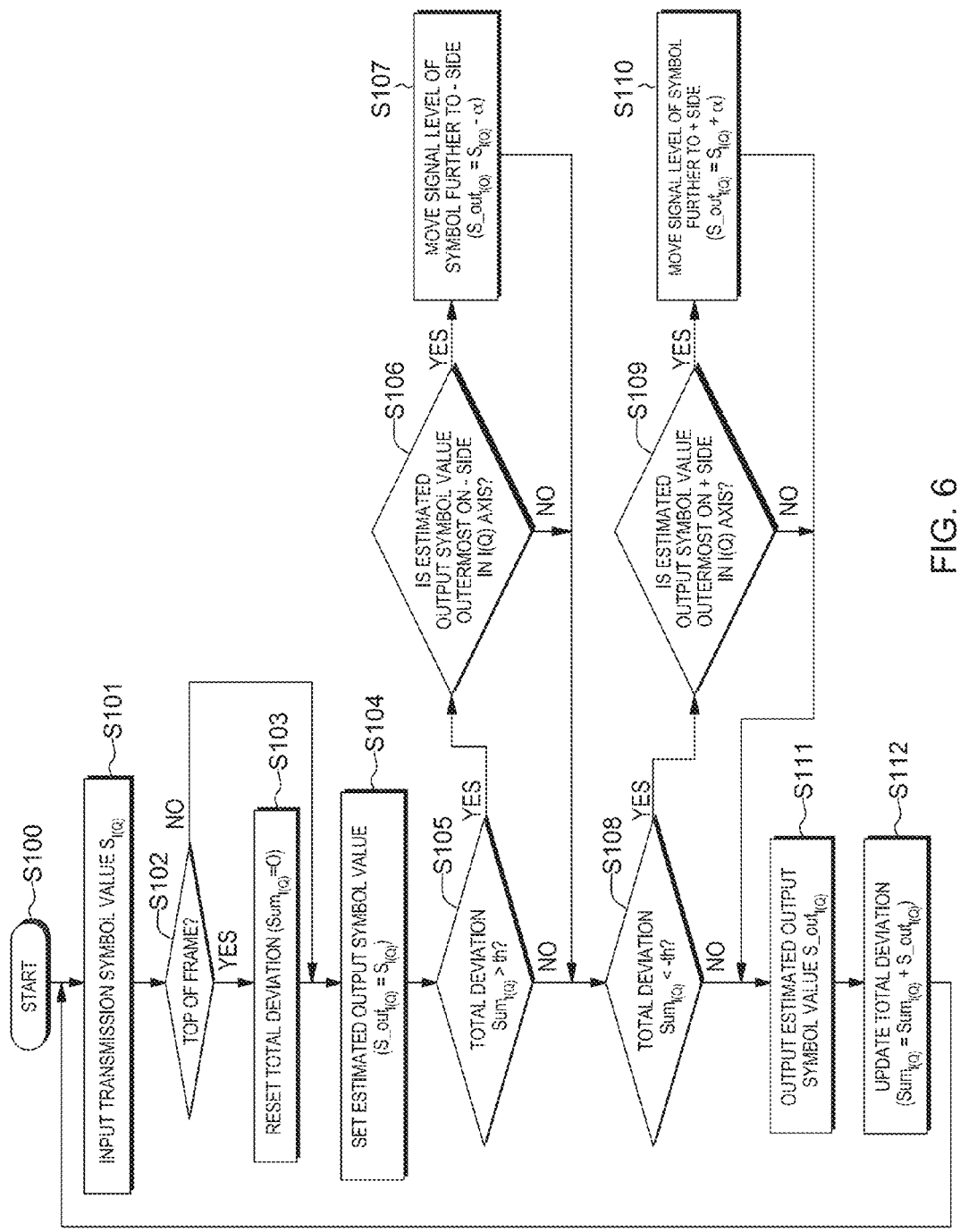
FIG. 6 is a flow chart showing a signal point rearrangement operation process of the symbols executed by a digital correction processing unit, within the environment of FIG. 1, in accordance with an embodiment of the present invention.

FIG. 6 is a flow chart showing a signal point rearrangement operation process of the symbols executed by a digital correction processing unit, within the environment of FIG. 1, in accordance with an embodiment of the present invention. Specifically, in accordance with one embodiment, a signal point rearrangement operation to process symbols, as executed by digital correction processing unit 136, is described in more detail.

The processes shown in FIG. 6 are initiated in response to the start of the transmission process to wireless communication apparatus 180, in step S100. Although the processing of the I phase by digital correction processing unit 136I is representatively described below, it should be noted that a substantially similar process is executed for the Q phase, which is indicated by parentheses in FIG. 6. In other words the following steps are substantially those followed by one embodiment of digital correction processing unit 136Q that processes the Q phase.

In step S101, digital correction processing unit 136I receives input of a data value $S_I$ indicating the signal level (hereinafter, the data value indicating the signal level will be referred to as a symbol value) on the I axis of a transmission symbol. In decision step S102, digital correction processing unit 136I determines whether the input transmission symbol is at the top of the transmission frame. If digital correction processing unit 136I determines that the transmission symbol is at the top (decision step S102, YES branch), then digital correction processing unit 136I proceeds to step S103. In step S103, digital correction processing unit 136I resets the total deviation of the signal levels of the total deviation monitoring unit 142I ($Sum_I$=0) and advances to step S104. If digital correction processing unit 136I determines that the transmission symbol is not at the top (decision step S102, NO branch), the process directly proceeds to step S104. In step S104, digital correction processing unit 136I sets the input transmission symbol value $S_I$ to an estimated output symbol value $S\_out_I$ (i.e., set $S\_out_I=S_I$).

In decision step S105, digital correction processing unit 136I determines whether a total amount of the deviations of the signal levels is accumulated greater than a predetermined threshold (th) to the + side (as indicated by "$Sum_I$>th?" in FIG. 6). To make such a determination, digital correction processing unit 136I compares the total amount of the deviations of the signal levels to a threshold. If digital correction processing unit 136I determines that the total amount of the deviations of the signal levels is accumulated greater than a predetermined threshold to the + side (decision step S105, YES branch), then digital correction processing unit 136I proceeds to decision step S106. The threshold (th) in decision step S105 defines a permitted total amount of the deviations on the + side. Although not particularly limited, the threshold th may be set to 0 to immediately determine the target symbols in the case where there is a deviation. Alternatively, the predetermined value (th>0) may be set to prevent frequent rearrangement of the signal points of the symbols. If digital correction processing unit 136I determines that the total amount of the deviations of the signal levels are not cumulatively greater than the threshold to the + side (decision step S105, NO branch, i.e., Sum$_I$>th?=NO), then digital correction processing unit 136I process proceeds to decision step S108.

In step S106, digital correction processing unit 136I determines whether the estimated output symbol value S_out$_I$ is the outermost value on the − side on the I axis. If digital correction processing unit 136I determines that the value is not the outermost on the − side (decision step S106, NO branch), then digital correction processing unit 136I proceeds to decision step S108, and the signal point rearrangement operation of the symbols is not executed. If digital correction processing unit 136I determines that the estimated output symbol value S_out$_I$ is the outermost value on the − side (decision step S106, YES branch), then digital correction processing unit 136I specifies transmission symbols as the target symbols, and proceeds to step S107.

In step S107, digital correction processing unit 136I sets, as an estimated output symbol value, a value obtained by moving the transmission symbol value S$_I$ as the outermost value on the − side further to the − side by the predetermined amount α (S_out$_I$=S$_I$−α) and advances to step S108.

In step S108, digital correction processing unit 136I determines whether the total amount of the deviations of the signal levels is accumulated greater than the threshold to the − side. If digital correction processing unit 136I determines that the total amount of the deviations is accumulated greater than the threshold to the − side (decision step S108, YES branch, i.e., Sum$_I$<−th?=YES), then digital correction processing unit 136I proceeds to decision step S109. In decision step S109, digital correction processing unit 136I determines whether the estimated output symbol value S_out$_I$ is the outermost value on the "+" side in the I axis. If digital correction processing unit 136I determines that the estimated output symbol value S_out$_I$ is the outermost value on the "+" side in the I axis (decision step S109, YES branch), then digital correction processing unit 136I proceeds to step S110. In step S110, digital correction processing unit 136I sets, as an estimated output symbol value, a value obtained by moving the transmission symbol value S$_I$ as the outermost value on the "+" side further to the "+" side by the predetermined amount α (S_out$_I$=S$_I$+α) and advances to step S111.

If digital correction processing unit 136I determines that the value is not the outermost on the "+" side in (decision step S109, NO branch), then digital correction processing unit 136I proceeds to step S111, and the signal point rearrangement operation of the symbol is not executed. If digital correction processing unit 136I determines that the total amount of the deviations of the signal levels is not accumulated greater than the threshold to the "−" side (decision step S108, NO branch, i.e., Sum$_I$<−th?=NO), then digital correction processing unit 136I advances to step S111.

In step S111, digital correction processing unit 136I uses the ultimately obtained estimated output symbol value S_out$_I$ to output the baseband data to the subsequent stage. In step S112, digital correction processing unit 136I updates the total amount of the deviations (Sum$_I$=Sum$_I$+S_out$_I$) in the total deviation monitoring unit 142I and loops the process to step S101 to advance the process for the next symbol. If no other signals exist, then processing of the transmitted symbol string by digital correction processing unit 136I ends for that instance.

The processes shown in steps S101 to S112 are applied to each symbol of the transmitted symbol string, and the outermost symbol can be selected to perform the rearrangement operation of the signal points when there is a deviation of signal level. Through the rearrangement operation of the signal points, the signal points at the outermost position on the opposite side of the deviation at that time point are emphasized, and the deviation of signal level is eliminated.

Figure 7:
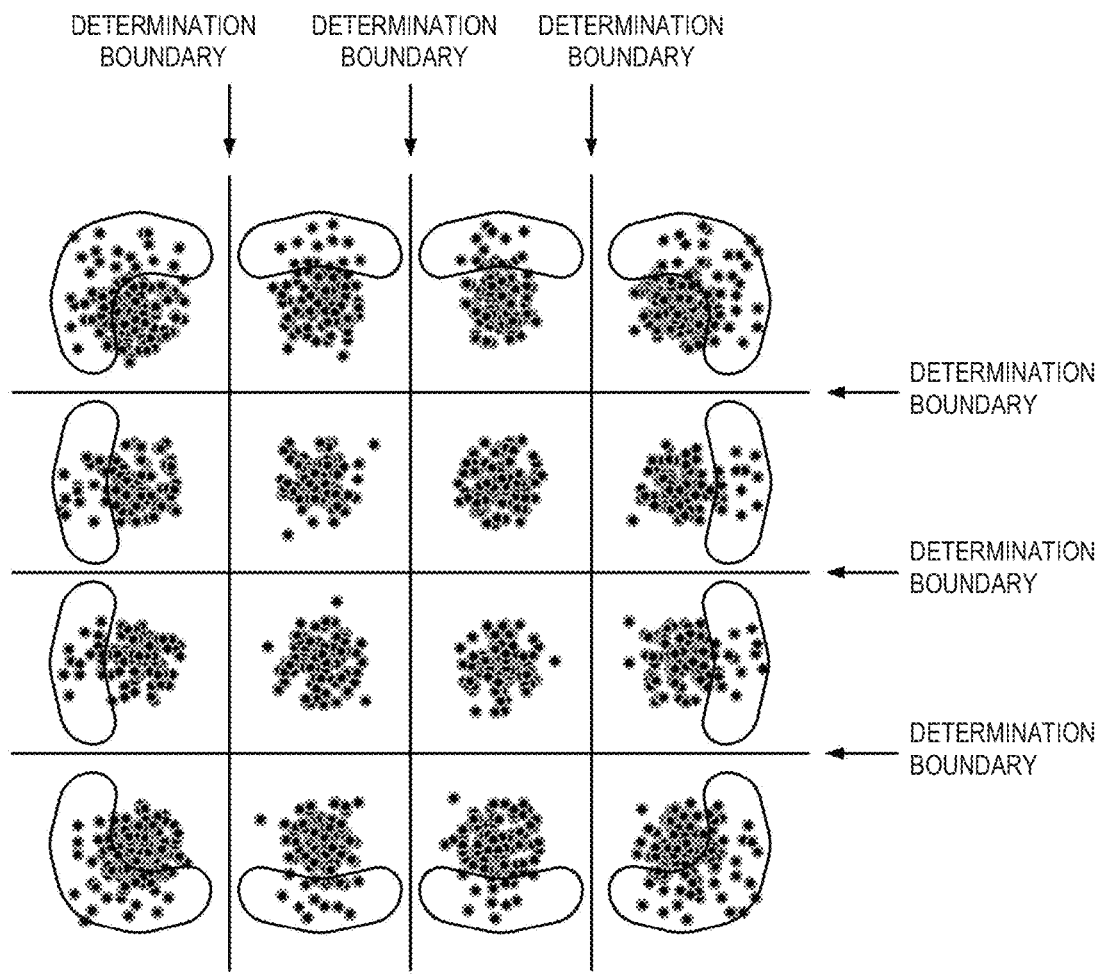
FIG. 7 is a schematic diagram plotting, on an I-Q plane, signal points in a reception baseband signal after a filtering process, observed by the wireless communication apparatus on the reception side, in accordance with the embodiment of FIG. 6.

FIG. 7 is a schematic diagram plotting, on an I-Q plane, signal points in a reception baseband signal after a filtering process, observed by the wireless communication apparatus on the reception side, in accordance with the embodiment of FIG. 6. FIG. 7 illustrates determination boundaries between adjacent symbols. As shown in FIG. 7, on the reception side, the transmission symbols are observed on the I-Q plane with certain distributions due to noise on the channel. The noise is typically white noise, and signal points of a symbol are integrated near the average value in the distribution.

In one embodiment, some of the outermost symbols are moved outward by the rearrangement operation of the signal points on the transmission side. Therefore, the distributions of the signal points belonging to outermost determination divisions defined by the determination boundaries are deviated outward compared to the distributions of the signal points belonging to inner determination divisions. Since the processes are independently executed for the baseband signals of the I phase and the Q phase in the present embodiment, the distributions deviated outward are observed in the I phase or the Q phase. The signal points at four corners of the outermost are independently moved in the I phase and the Q phase, and as a result, the signal points with moved signal levels are observed in both of the I phase and the Q phase.

Further, since the movement of the signal points by the rearrangement operation of the signal points on the transmission side is performed in directions without any more adjacent symbols, the determination boundaries on the reception side are not adversely affected. This is because the determination boundaries are arranged only relative to the inner symbols. In this way, the target symbols subjected to the rearrangement operation of the signal points are limited to the outermost signal points, and the DC imbalance are reduced without the generation of erroneous determination in the demodulation on the reception side.

In one embodiment, as described above, processing steps are independently applied to the baseband signals of the I phase and the Q phase. Hereinafter, another embodiment of digital correction processing unit 136I and digital correction processing unit 136Q (hereinafter "digital correction processing unit 136") is described, which processes a combination of the I phase and the Q phase, is further described with reference to FIGS. 8 and 9.

Figure 8:
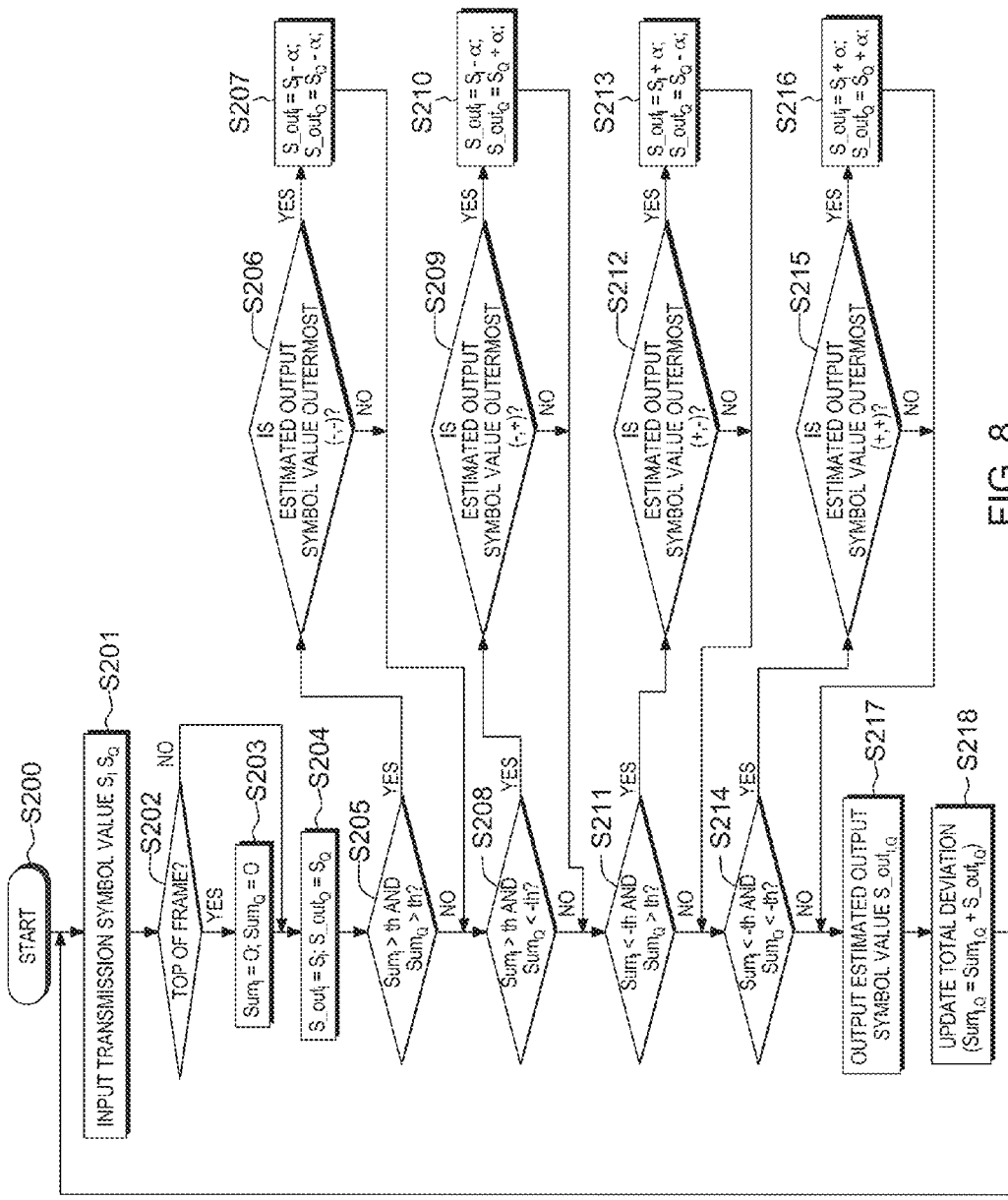
FIG. 8 is a flow chart showing a signal point rearrangement operation process of symbols executed by the digital correction processing unit, in accordance with an embodiment of the present invention.

FIG. 8 is a flow chart showing a signal point rearrangement operation process of symbols executed by the digital correction processing unit, in accordance with an embodiment of the present invention. Note that FIG. 8 is a flow chart showing a signal point rearrangement operation process of symbols according to another embodiment of digital correction processing unit 136(I/Q). The process shown in FIG. 8 is started from step S200 in response to the start of the transmission process. In the following description, digital correction processing unit 136 executes the processing of both the I phase and the Q phase.

In step S201, digital correction processing unit 136 receives input of symbol values S$_I$ and S$_Q$ indicating the signal levels on the I axis and the Q axis of the transmission symbols. In step S202, digital correction processing unit 136 determines whether the input transmission symbol is at the top of the transmission frame. If digital correction processing unit 136 determines that the transmission symbol is at the top (decision step S202, YES branch), then digital correction processing unit 136 resets the total deviations of the I phase and the Q phase in step S203 (i.e., set $\text{Sum}_I=0$; $\text{Sum}_Q=0$). If digital correction processing unit 136 determines that the transmission symbol is not at the top in step (decision step S202, NO branch), then digital correction processing unit 136 proceeds to step S204.

In step S204, digital correction processing unit 136 sets the input transmission symbol values as estimated output symbol values ($\text{S\_out}_I=S_I$; $\text{S\_out}_Q=S_Q$). In decision steps S205, S208, S211, and S214, the process branches according to the result of comparison between the total amounts of the deviations of the I phase and the Q phase and a threshold as shown in FIG. 9(A).

In decision step S205, digital correction processing unit 136 determines whether the total deviations of the I phase and the Q phase are respectively greater than the threshold on the positive side (+th), (i.e., whether $\text{Sum}_I>\text{th}$ and whether $\text{Sum}_Q>\text{th}$). If digital correction processing unit 136 determines that the total deviations of the I phase and the Q phase are respectively greater than the threshold (+th) (decision step S205, YES branch), then digital correction processing unit 136 proceeds to step S206. If digital correction processing unit 136 determines that the total deviations of the I phase and the Q phase are not respectively greater than the threshold (+th) (decision step S205, NO branch), then digital correction processing unit 136 proceeds to decision step S208.

In decision step S206, the digital correction processing unit 136 further determines whether the estimated output symbol values $\text{S\_out}_I$ and $\text{S\_out}_Q$ of the I phase and the Q phase are outermost values on the negative (−) side. If digital correction processing unit 136 determines that the values of the I phase and the Q phase are not the outermost values on the negative (−) side (decision step S206, NO branch), then digital correction processing unit 136 proceeds to decision step S208. If digital correction processing unit 136 determines that the values of the I phase and the Q phase are the outermost values on the negative (−) side (decision step S206, YES branch), then digital correction processing unit 136 proceeds to step S207. In step S207, digital correction processing unit 136 sets, as estimated output symbols values, values obtained by moving the transmission symbol values $S_I$ and $S_Q$ further to the negative (−) side by the predetermined amount $\alpha$ ($\text{S\_out}_I=S_I-\alpha$; $\text{S\_out}_Q=S_Q-\alpha$), and proceeds to decision step S208.

In decision step S208, digital correction processing unit 136 determines whether the total deviation of the I phase is greater than the threshold on the positive side (+th) and whether the total deviations of the Q phase is less than the value of the threshold on the negative side (−th), (i.e., whether $\text{Sum}_I>\text{th}$ and whether $\text{Sum}_Q<-\text{th}$). If digital correction processing unit 136 determines that the total deviation of the I phase is greater than the threshold (+th) and that the total deviations of the Q phase is less than the threshold (−th) (decision step S208, YES branch), then digital correction processing unit 136 proceeds to decision step S209. If digital correction processing unit 136 determines that the total deviation of the I phase is not greater than the threshold (+th) and that the total deviations of the Q phase is not less than the threshold (−th) (decision step S208, NO branch), then digital correction processing unit 136 proceeds to decision step S211.

In decision step S209, digital correction processing unit 136 determines whether the estimated output symbol value $\text{S\_out}_I$ of the I phase is the outermost value on the negative side and whether the estimated output symbol value $\text{S\_out}_Q$ of the Q phase is the outermost value on the positive side. If digital correction processing unit 136 determines that the estimated output symbol value $\text{S\_out}_I$ of the I phase is not the outermost value on the negative side and that the estimated output symbol value $\text{S\_out}_Q$ of the Q phase is not the outermost value on the positive side (decision step S209, NO branch), then digital correction processing unit 136 proceeds to decision step S211. If digital correction processing unit 136 determines that the estimated output symbol value $\text{S\_out}_I$ of the I phase is the outermost value on the negative side and that the estimated output symbol value $\text{S\_out}_Q$ of the Q phase is the outermost value on the positive side (decision step S209, YES branch), then digital correction processing unit 136 proceeds to step S210. In step S210, digital correction processing unit 136 sets, as the estimated output symbol value of the I phase, a value obtained by moving the transmission symbol value $S_I$ further to the negative side by the predetermined amount $\alpha$ ($\text{S\_out}_I=S_I-\alpha$) and sets, as the estimated output symbol value of the Q phase, a value obtained by moving the transmission symbol value $S_Q$ further to the positive side by the predetermined amount $\alpha$ ($\text{S\_out}_Q=S_Q+\alpha$), and proceeds to decision step S211.

In decision step S211, digital correction processing unit 136 determines whether the total deviation of the I phase is less than the negative value of the threshold (−th) and whether the total deviations of the Q phase is greater than the value of the threshold (th), (i.e., whether $\text{Sum}_I<-\text{th}$ and whether $\text{Sum}_Q>\text{th}$). If digital correction processing unit 136 determines that the total deviation of the I phase is less than the negative value of the threshold and that the total deviations of the Q phase is greater than the value of the threshold (decision step S211, YES branch), then digital correction processing unit 136 proceeds to step S212. If digital correction processing unit 136 determines that the total deviation of the I phase is not less than the negative value of the threshold and that the total deviations of the Q phase is not greater than the value of the threshold (decision step S211, NO branch), then digital correction processing unit 136 proceeds to decision step S214.

In decision step S212, digital correction processing unit 136 determines whether the estimated output symbol value $\text{S\_out}_I$ of the I phase is the outermost value on the positive side and that the estimated output symbol value $\text{S\_out}_Q$ of the Q phase is the outermost value on the negative side. If digital correction processing unit 136 determines that the estimated output symbol value $\text{S\_out}_I$ of the I phase is not the outermost value on the positive side and that the estimated output symbol value $\text{S\_out}_Q$ of the Q phase is not the outermost value on the negative side (decision step S212, NO branch), then digital correction processing unit 136 proceeds to decision step S214. If digital correction processing unit 136 determines that the estimated output symbol value $\text{S\_out}_I$ of the I phase is the outermost value on the positive side and that the estimated output symbol value $\text{S\_out}_Q$ of the Q phase is the outermost value on the negative side (decision step S212, YES branch), then digital correction processing unit 136 proceeds to step S213. In step S213, digital correction processing unit 136 sets, as the estimated output symbol value of the I phase, a value obtained by moving the transmission symbol value $S_I$ further to the positive side by the predetermined amount $\alpha$ ($\text{S\_out}_I=S_I+\alpha$) and sets, as the estimated output symbol value of the Q phase, a value obtained by moving the transmission symbol value $S_Q$ further to the negative side by the predetermined amount $\alpha$ ($\text{S\_out}_Q=S_Q-\alpha$), and proceeds to decision step S214.

In decision step S214, digital correction processing unit 136 determines whether the total deviations of the I phase and the Q phase are respectively less than the negative value of the threshold (−th), (i.e., whether $Sum_I$<−th and whether $Sum_Q$<−th). If digital correction processing unit 136 determines that the total deviations of the I phase and the Q phase are respectively less than the negative value of the threshold (−th) (decision step S214, YES branch), then digital correction processing unit 136 proceeds to step S215. If digital correction processing unit 136 determines that the total deviations of the I phase and the Q phase are not respectively less than the negative value of the threshold (−th) (decision step S214, NO branch), then digital correction processing unit 136 proceeds to step S217.

In decision step S215, digital correction processing unit 136 determines whether the estimated output symbol values $S\_out_I$ and $S\_out_Q$ of the I phase and the Q phase are the outermost values on the positive side. If digital correction processing unit 136 determines that the estimated output symbol values $S\_out_I$ and $S\_out_Q$ of the I phase and the Q phase are not the outermost values on the positive side (decision step S215, NO branch), then digital correction processing unit 136 proceeds to step S217. If digital correction processing unit 136 determines that the estimated output symbol values $S\_out_I$ and $S\_out_Q$ of the I phase and the Q phase are the outermost values on the positive side (decision step S215, YES branch), then digital correction processing unit 136 proceeds to step S216. In step S216 digital correction processing unit 136 sets, as the estimated output symbol values, values obtained by moving the transmission symbol values $S_I$ and $S_Q$ of the I phase and the Q phase further to the positive side by the predetermined amount α ($S\_out_I = S_I + α$; $S\_out_Q = S_Q + α$), and proceeds to step S217.

In step S217, digital correction processing unit 136 outputs the ultimate estimated output symbol values $S\_out_I$ and $S\_out_Q$ of the I phase and the Q phase to the subsequent stage. In step S218, digital correction processing unit 136 accumulates the total amounts of the deviations of the I phase and the Q phase ($Sum_I = Sum_I + S\_out_I$; $Sum_Q = Sum_Q + S\_out_Q$) and loops the process to step S201 to advance the process to the next symbol. If no other signals exist, then processing of the transmitted symbol string by digital correction processing unit 136 ends for that instance.

FIG. 9A is a diagram describing rearrangement operation of signal points of the symbols executed according to the total deviation of the signal levels in the I axis and the Q axis, in accordance with the embodiment of FIG. 8.

Figure 9B:
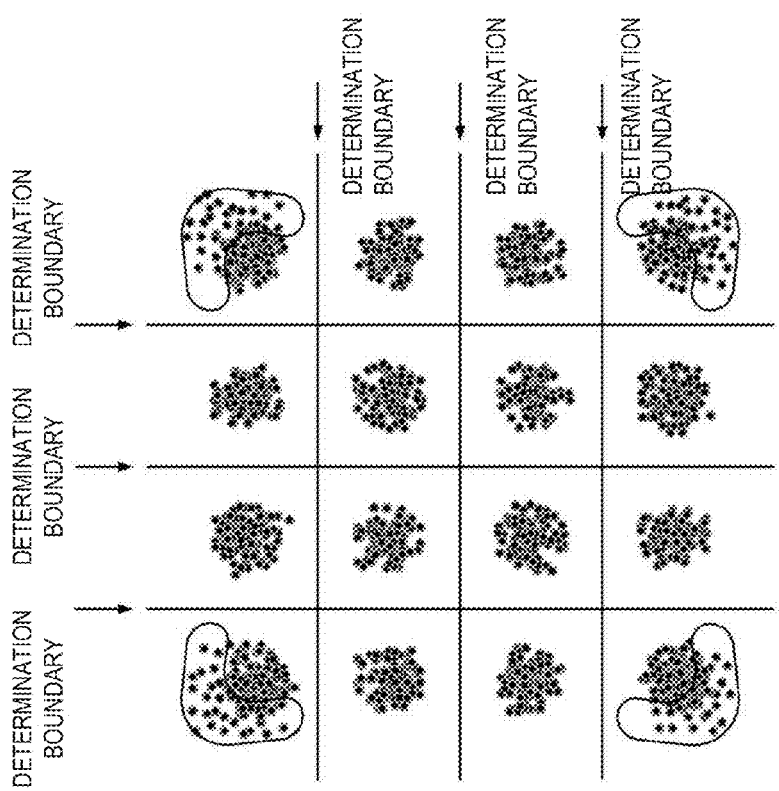
FIG. 9B shows a schematic diagram plotting, on the I-Q plane, the signal points of the reception baseband signal after the filtering process, observed by a wireless communication apparatus on the reception side, in accordance with the embodiment of FIG. 8.
Figure 9A:
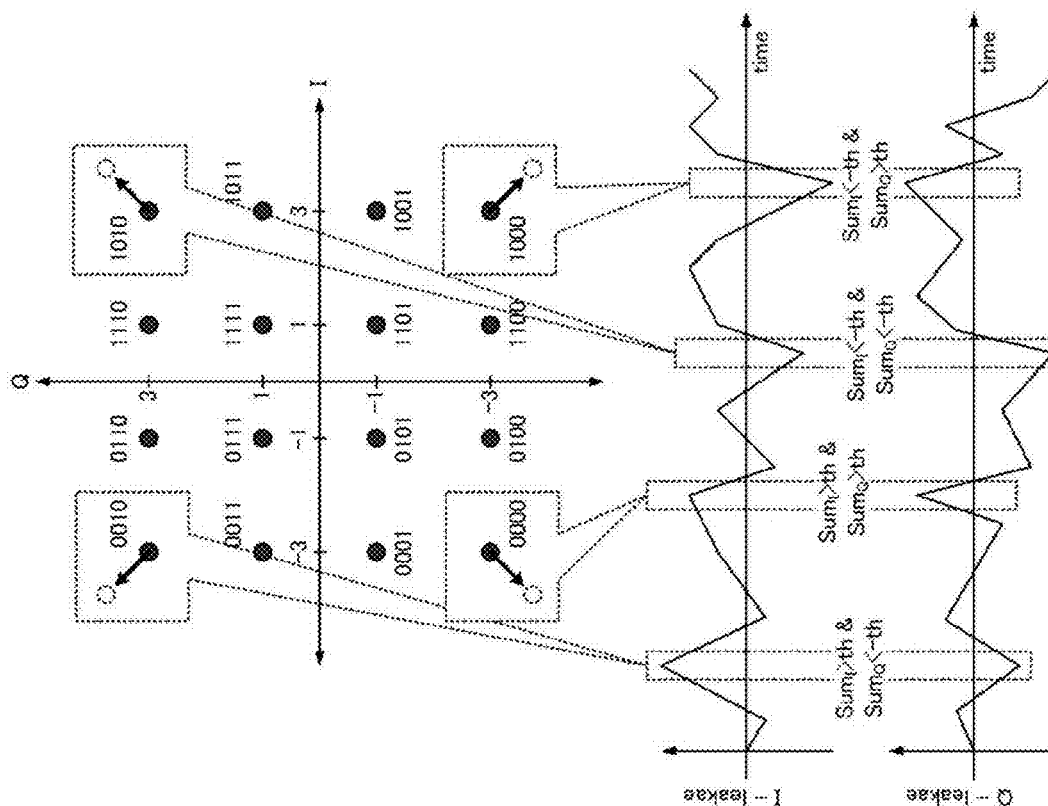
FIG. 9A is a diagram describing rearrangement operation of signal points of the symbols executed according to the total deviation of the signal levels in the I axis and the Q axis, in accordance with the embodiment of FIG. 8.

FIG. 9B shows a schematic diagram plotting, on the I-Q plane, the signal points of the reception baseband signal after the filtering process, observed by the wireless communication apparatus 180 on the reception side, in accordance with the embodiment of FIG. 8. In the embodiment of FIG. 8, since the process is executed by the combination of the I phase and the Q phase, the signal levels are deviated outward in the I phase and the Q phase only in the four corners of the outermost signal points in the observed distribution.

Figure 10:
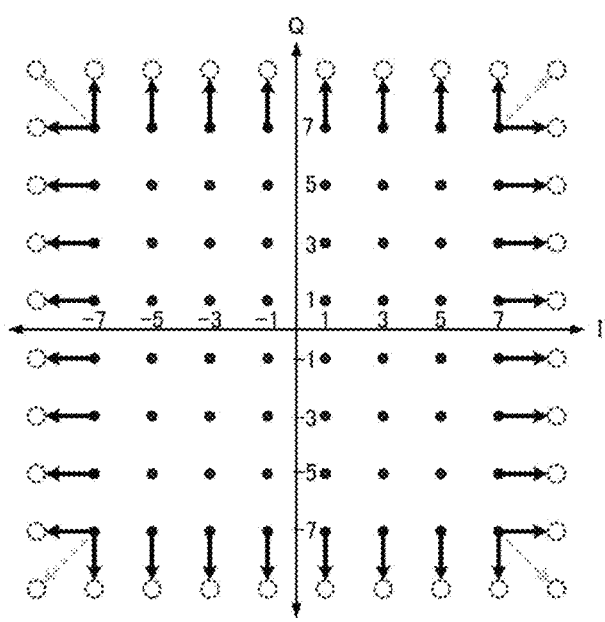
FIG. 10 is a diagram describing rearrangement operation of signal points of symbols, in accordance with an embodiment of the present invention.

FIG. 10 is a diagram describing rearrangement operation of signal points of symbols, in accordance with an embodiment of the present invention. In this case, the signal points are moved to maintain substantially the same phase on the I-Q plane. Therefore, in various filtering processes, such as compensation of rotation of constellation observed on the reception side due to frequency offset, phase noise, or the like and removal of ISI (Inter Symbol Interference), the angle components of the signal point arrangement are held, and this is suitable when it is not desired to adversely affect the phase noise.

Although an example of 16 QAM is described in the above embodiments, the modulation system adopted by wireless communication apparatuses 110 and 180 is not limited as such. The rearrangement operation of signal points of symbols according to the present embodiment may be applied to, for example, a multi-level modulation system, such as 64 QAM, which shown in FIG. 10.

Hereinafter, a DC offset compensation process executed by offset compensation unit 140 according to one embodiment will be described with reference to FIGS. 3, 11, and 12. Such an offset compensation unit 140, as shown in FIG. 3, executes a correction process of transforming an output waveform of the baseband signal to cancel the variations in the reference level observed on the reception side in the subsequent stage of symbol operation processing unit 138.

Offset compensation unit 140 holds parameters for executing the correction process, or more specifically, holds variation models of the reference level of the baseband signal on the reception side. The variation models are obtained by modeling the variations of the reference level in the baseband signal observed on the reception side caused by the capacitive coupling existing throughout the entire communication channel between wireless communication apparatus 110 (as a transmission side) and wireless communication apparatus 180 (as a communication partner). In some embodiments, variations caused by the capacitive coupling are characterized by time constants, and the time constants of the capacitive coupling are obtained based, at least in part, on the variation models.

In some embodiments, variation models are formed based, at least in part, on the result of actual execution of transmission and on the reception of signals, which is based, at least in part, on test data between wireless communication apparatuses 110 and 180 (e.g., in a calibration process before the sending of a communication signal commences). Offset compensation unit 140 computes compensation values necessary for canceling the variations in the DC offset based on the variation models. The output waveform of the baseband signal is transformed according to the computed compensation values of the DC offset.

Figure 11:
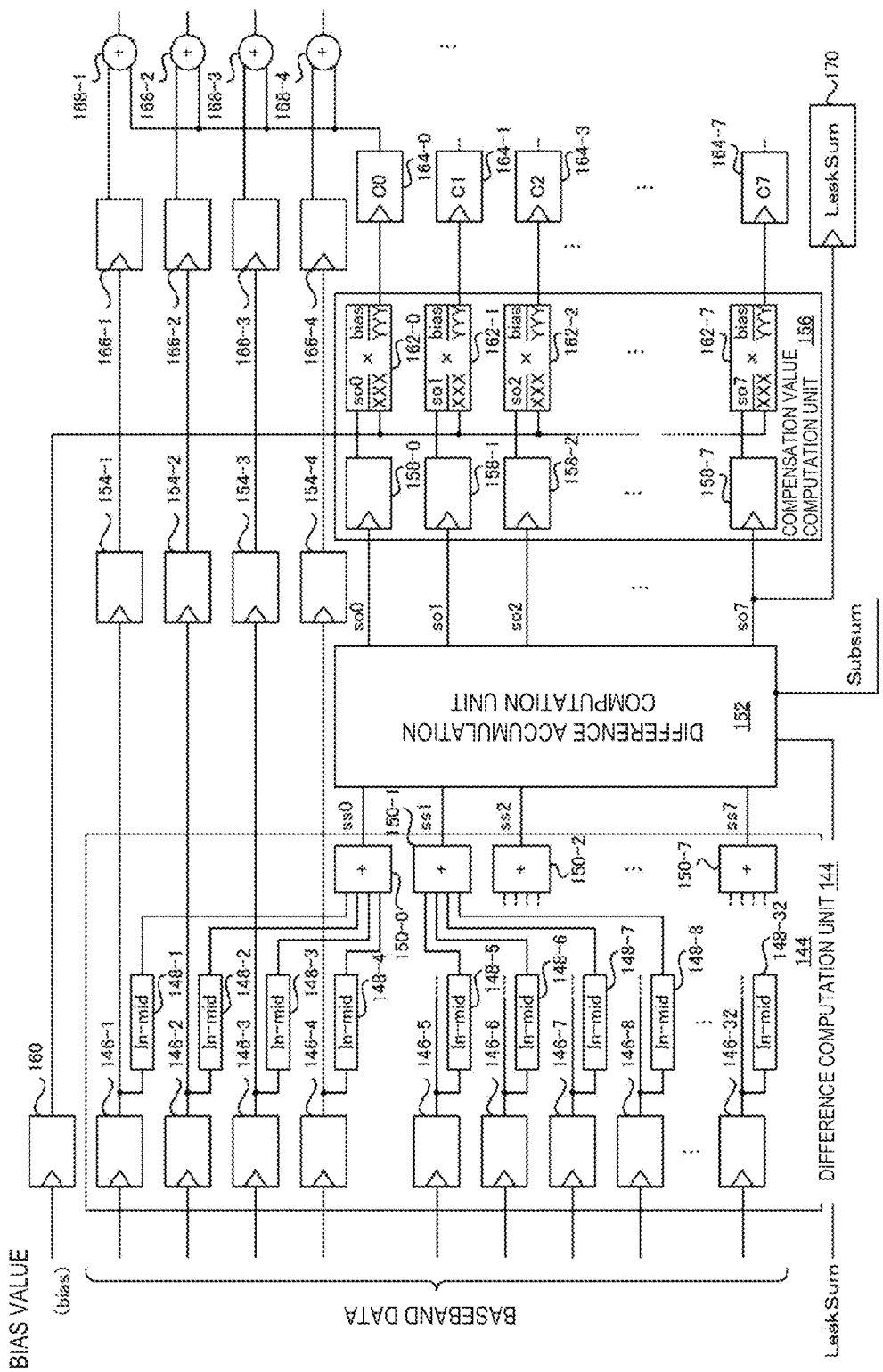
FIG. 11 is a block diagram showing a circuit configuration of an offset compensation unit, in accordance with an embodiment of the present invention.

FIG. 11 is a block diagram showing a circuit configuration of an offset compensation unit, in accordance with an embodiment of the present invention. Offset compensation unit 140 includes difference computation unit 144, difference accumulation computation unit 152, compensation value computation unit 156, and adders 168. Difference computation unit 144 computes differences between corresponding data values (integer values according to the resolving power of the DACs associated with the signal levels (−3, −1, 1, 3) in the described embodiment) and a data value (median) corresponding to the reference level, for sample points of the input baseband data.

Difference accumulation computation unit 152 computes cumulative values of the differences from a predetermined reference time point to the sample points. In compensation value computation unit 156, multipliers 162 multiply the difference cumulative values up to the sample points of the baseband data by bias values 160 according to the variation models (correction parameters according to time constants of the variation models) to compute compensation values for compensating the variations in the DC offset at the time points corresponding to the sample points.

Adders 168 add the computed compensation values to the data values corresponding to the sample points of the baseband data. In the described embodiment, values obtained by adding the compensation values to the data values corresponding to the sample points of the original baseband data are input to DACs 124 and converted to voltage signals to transform the output waveform of the baseband signal. As a result, the variations in the DC offset on the reception side are canceled, and the output voltage at each time point of the original baseband signal is changed up and down to obtain an ideal signal waveform on the reception side.

In the embodiment shown in FIG. 11, the baseband data is parallelized and input for every predetermined number of samples (32 symbols in the illustration of FIG. 11), and the parallel computation of the difference, the cumulative value of the difference, and the compensation value is performed in predetermined increments of samples (4 symbols in the illustration of FIG. 11, and the increments will be referred to as "computation increments").

Among the blocks shown in FIG. 11, the difference computation unit 144 and the difference accumulation unit 152 can be used to form the total deviation monitoring unit 142. More specifically, the difference computation unit 144 includes latch registers 146-1 to 146-32 corresponding to the predetermined number of samples holding the DAC values (data values) of the input baseband data, difference calculators 148-1 to 148-32, and total difference calculators 150-0 to 150-7.

Each of difference calculators 148 calculates a difference between the DAC value held by latch register 146 and a reference value mid of signal (for example, a median of 128 is used if the DAC value is 8 bits, and a median of 512 is used if the DAC value is 10 bits). Each of total difference calculators 150 receives input of the difference value from each difference calculator belonging to the computation increments handled by total difference calculator 150 and calculates a total difference of the computation increments. In the illustration of FIG. 11, 8 (from 32 samples/4 samples=8) total difference calculators 150-0 to 150-7 are arranged as total difference calculators 150.

Total difference calculators 150 output difference total values (ss0 to ss7) to difference accumulation computation unit 152. Difference accumulation computation unit 152 calculates partial sums of the difference total values (ss0 to ss7) of the computation increments, computes difference cumulative values from a predetermined reference time point to the computation increments, and causes latch registers 158 to hold the difference cumulative values. The difference cumulative values are values indicating the deviations of the signal levels accumulated from the predetermined reference time point, and the following formula can be used to calculate the values in the illustration of FIG. 11. In the following expression of Table 1, ss* denotes the difference total value of *th (* is 0 to 7 in the illustration of FIG. 11) computation increments, and so* denotes the difference cumulative value of *th computation increments.

TABLE 1

(Expression 1)

so0 = LeakSum + ss0
so1 = LeakSum + ss0 + ss1
so2 = LeakSum + ss0 + ss1 + ss2
.
.
.
so7 = LeakSum + ss0 + ... + ss7

The difference cumulative value so7 of the last computation increments is input to latch register 170 and is transferred as LeakSum for computation in the next clock cycle. The difference cumulative values so0 to so7 of the computation increments are input to latch registers 158-0 to 158-7.

In some embodiments, when the process is executed in increments of 32 symbols in each clock cycle in the processing flow, as shown in the embodiment of FIG. 6, the LeakSum is used as an index value of the total amount of deviation in the next clock cycle. When the process is executed on the basis of symbols, the difference cumulative values from the predetermined reference time point to the symbols (partial sums of LeakSum and output of the difference calculators 148-1 to 148-32) are calculated, and the values are used as index values of the total amounts of deviations of the symbols.

The baseband data subjected to the offset compensation process by the circuit described above is input to DACs 124. Baseband signals are output to transmission circuit 128 of RF unit 114 of the subsequent stage, and transmitted to wireless communication apparatus 180 on the reception side.

FIGS. 12A-12D are diagrams showing an offset compensation process on the transmission side, with signal waveforms, in accordance with an embodiment of the present invention. FIG. 12A shows an example of a waveform of a baseband signal before the correction. FIG. 12B shows an example of a time series of compensation values calculated for the baseband signal illustrated in FIG. 12A. FIG. 12C shows an example of a waveform of the baseband signal after the correction subjected to wave transformation based on the time series of the compensation values. FIG. 12D is a diagram schematically showing a reception baseband signal waveform observed by the reception-side wireless communication apparatus 180 that has received the baseband signal after the correction.

In one embodiment, when a signal waveform as shown in FIG. 12A is transmitted from wireless communication apparatus 110, a signal waveform in a distorted state according to the time constants is observed on the reception side due to the capacitive coupling on the channel. In another embodiment of wireless communication apparatus 110, the offset compensation process adds the compensation values shown in FIG. 12B to the original baseband signal before the correction, and a waveform distorted in appearance as shown in FIG. 12C is output. However, when the baseband signal is transmitted to the reception side, a waveform approximated to an ideal before the correction as shown in FIG. 12D is observed on the reception side, because of the coupling on the transmission channel.

Figure 13A:
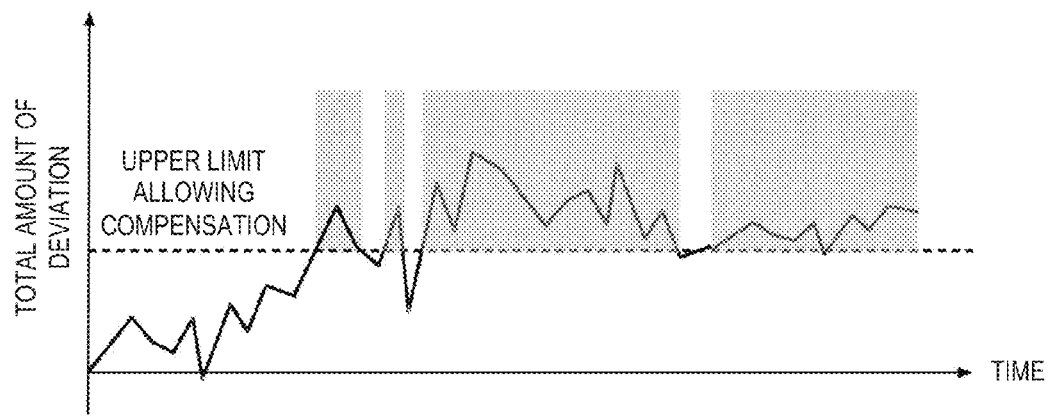
FIGS. 13A-13B are diagrams showing time change of the total amount of the deviations of the signal levels observed when a predetermined symbol string is transmitted, in accordance with an embodiment of the present invention.
Figure 13B:
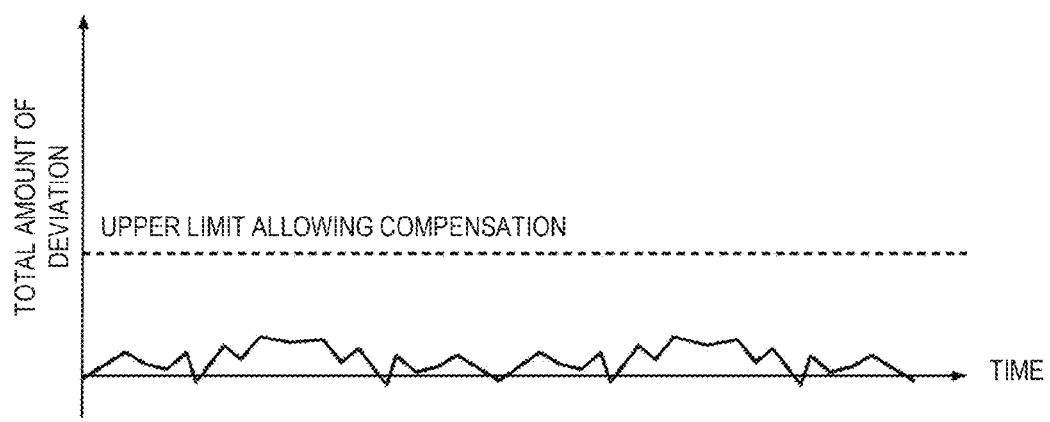

FIGS. 13A-13B are diagrams showing time change of the total amount of the deviations of the signal levels observed when a predetermined symbol string is transmitted, in accordance with an embodiment of the present invention. FIG. 13A illustrates time change of the total amount of the deviations when the signal point rearrangement operation of the symbols is not applied, and FIG. 13B illustrates time change of the total deviation when the signal point rearrangement operation of the symbols is applied. In FIGS. 13A and 13B, wavy lines show an upper limit that allows the offset compensation according to the dynamic range of DAC 124.

When the signal point rearrangement operation of the symbols is not applied, the offset compensation cannot be performed at the stage (gray areas) where the total amount of the deviations exceeds the upper limit that allows the compensation as shown in FIG. 13A, and an error is generated. Although the compensation can be sufficiently performed if the range that allows the offset compensation is sufficiently wide according to the length of the transmission frame, the range that allows the offset compensation is finite. Particularly, a large dynamic range is hard to obtain in a high-speed DAC, or the cost is significantly high.

Furthermore, high-capacity streaming transmission, such as transmission and reception of high-definition video data, is highly demanded in the millimeter-wave wireless communication technique. If the frame length is small, the proportion of the overhead of the header and the error correction code section other than the payload to the frame length becomes large relative to the payload, and the execution speed decreases. Therefore, an increase in the frame length is demanded. However, if the frame length is large, there is an increase in the probability that the compensation cannot be performed within the offset compensation range, and errors tend to occur. If errors that cannot be corrected frequently occur, the frequency of retransmission of the frame increases, and this is a problem in the streaming transmission in which low delay is demanded.

On the other hand, when the signal point rearrangement operation of the symbols is applied, the deviation of the signal level is eliminated by the rearrangement operation for moving the signal points of the outermost symbols opposite the deviation outward every time the deviation of the signal level exceeds the reference. In addition, the accumulation of the deviations of the signal levels is suppressed as shown in FIG. 13(B), and the increase in the compensation value necessary in the offset compensation can be suppressed. In addition, errors caused by the coupling are less likely to occur even if the frame is relatively long. Since the rearrangement operation is limited to the outermost symbols, there is no erroneous determination in the demodulation on the reception side.

A numerical analysis model for simulating a communication system was established below, and simulation was performed by assuming various noise environments. Communications System Toolbox (registered trademark) of numerical analysis software MATLAB® (The MathWorks, Inc.) was used for the simulation. The simulation used a configuration of a communication system connecting a modulator (transmission side) and a demodulator (reception side) on a channel provided with a variation model of a predetermined time constant and additive white Gaussian noise (e.g., Additive White Gaussian Noise (AWGN)). Bit error rates (Bit Error Rate (BER)) when a bit string with a predetermined length was transmitted through an AWGN channel with various strengths were obtained for a case in which the DC offset compensation and the signal point rearrangement operation of the symbols were not performed, for a case in which only the DC offset compensation was performed, and for a case in which both of the DC offset compensation and the signal point rearrangement operation of the symbols were performed. 16QAM was adopted as the modulation system, and the length of the bit string was 1M bits. The bit string was random in which the data was generated by using pseudo-random numbers. The signal point rearrangement operation of the symbols followed the processes shown in FIGS. 5 and 6, and the threshold (th) for the total deviation was 0.

Figure 14:
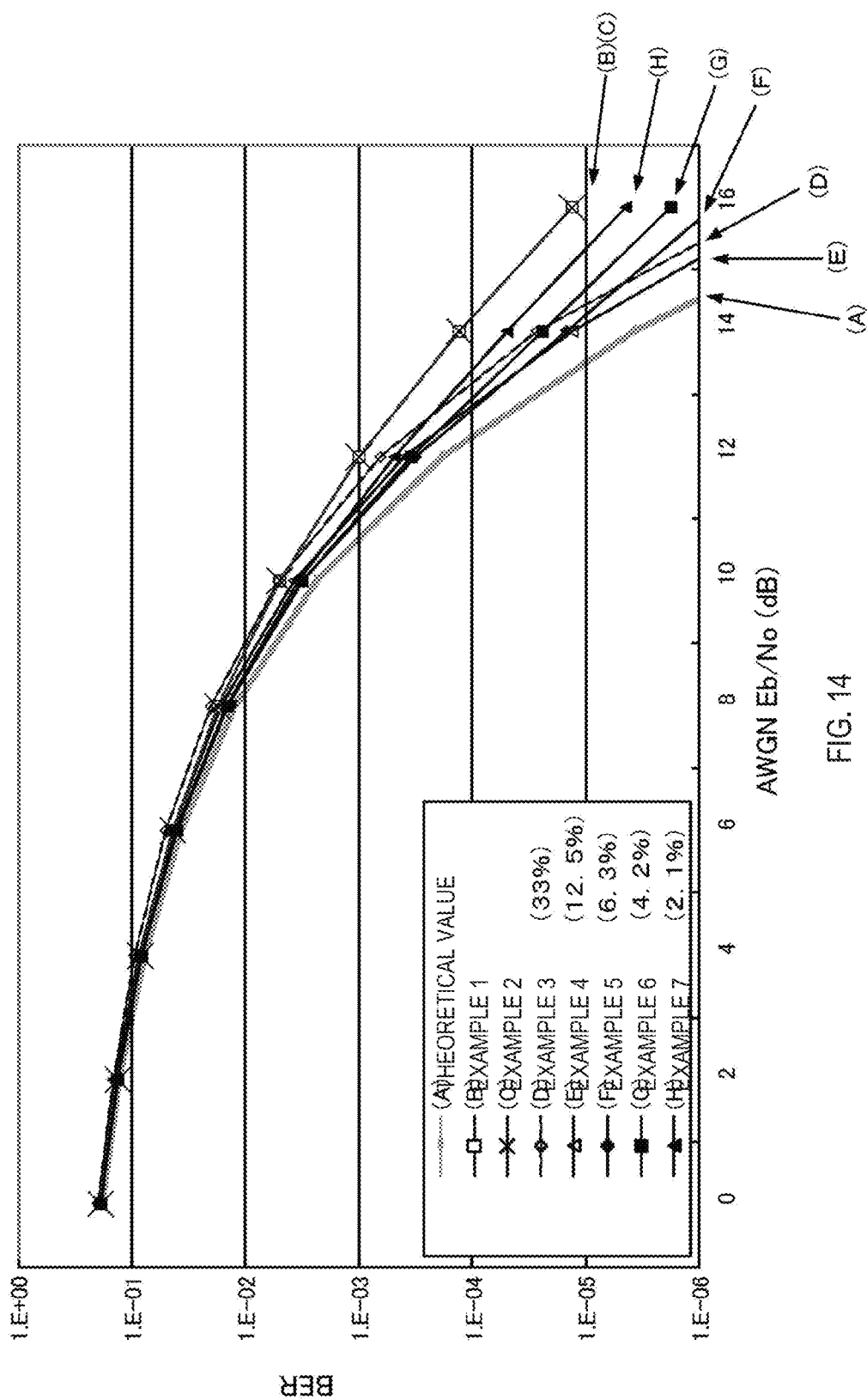
FIG. 14 is a graph plotting a BER on the I-Q plane obtained upon the passage through an AWGN environment channel and plotting an energy per bit to noise power spectral density ratio (Eb/No) on the horizontal axis, in accordance with an embodiment of the present invention.

FIG. 14 is a graph plotting a BER on the I-Q plane obtained upon the passage through an AWGN environment channel (on the vertical axis) and plotting energy per bit to noise power spectral density ratio (Eb/No) (on the horizontal axis), in accordance with an embodiment of the present invention. The graph shows the linear plots of a theoretical value (A) and seven examples labeled (B)-(H). In the graph shown in FIG. 14, linear plot (A) depicts a theoretical value of the BER when there is no variation in the reference level, linear plot (B) depicts Example 1 in which the offset compensation and the signal arrangement operation process of the symbols are not performed, and linear plot (C) depicts Example 2 in which only the offset compensation is performed. Linear plots (D) to (H) depict Examples 3 through 7, in which both of the offset compensation and the signal point rearrangement operation of the symbols are performed, and wherein the amounts of movement α of the rearrangement are 33%, 12.5%, 6.3%, 4.2%, and 2.1%, respectively. The amount of movement is a value standardized by the symbol-to-symbol distance in 16 QAM. Examples 1 and 2 represent comparative examples, and Examples 3 to 7 represent embodiments.

As illustrated in FIG. 14, the BER is improved by applying both of the offset compensation and the signal point rearrangement operation of the symbols, compared to when the offset compensation is not performed (such as seen in Example 1) and when only the offset compensation is performed (such as seen in Example 2). As shown by FIG. 14, a noticeable improvement occurs when the amount of movement of the rearrangement is as low as approximately 2.1%, and there is an increased degree of improvement particularly when the amount of movement was set to 10% or more (e.g., 12.5%, 33%).

As described, embodiments include one or more of a transmission apparatus, a communication system, a circuit apparatus, a communication method, and a program that reduces the deviations of the signal levels that generate short-term DC offsets or low-frequency components caused by the AC coupling and reduces generation of errors caused by the DC offsets or the low-frequency components.

According to the signal point arrangement operation process of the symbols, the generation of the variations in the reference level caused by the coupling that may be observed by the reception apparatus can be suitably suppressed without additional bit insertion such as encoding. In addition, the frequency of the retransmission control and the error rate of the entire system can be improved. The signal point rearrangement operation of the symbols can be particularly combined with the offset compensation process to suitably prevent the generation of errors in a range that allows compensation even if the frame length is relatively long, and this is advantageous in high-speed, high-capacity streaming transmission. Furthermore, the load is off-loaded to the transmission side, and this is advantageous in communication at a high-speed data rate. Since the transmission side recognizes the type of data transmitted by the transmission side, this is efficient compared to a configuration in which the correction is performed in the reception apparatus.

Part or all of the functional units described above can be mounted on a programmable device (PD), such as a field programmable gate array (FPGA), or can be provided as an ASIC (Application Specific Integrated Circuit). The functional units can be distributed by a recording medium as circuit configuration data (bit stream data) downloaded on the PD to implement the functional units on the PD or as data described by HDL (Hardware Description Language), VHDL (Very high speed integrated circuit Hardware Description Language), Verilog-HDL, or the like for generating the circuit configuration data.

Although the embodiments of the present invention have been described, the embodiments of the present invention are not limited to the embodiments described above. Changes can be made within a range that can be envisioned by those skilled in the art, such as other embodiments, additions, changes, and deletions. Any of these modes that attain the effects of the present invention are included in the scope of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

What is claimed is:

1. A transmission apparatus configured to communicate with a reception apparatus, the transmission apparatus comprising:
   a monitoring unit configured to monitor a total amount of deviations of signal levels in signals forming an unmodified transmission symbol string;
   a symbol specifying unit configured to specify target symbols from the unmodified transmission symbol string based on the total amount of deviations of the signal levels, and wherein each of the target symbols has a signal level at a position which is the outermost position of a corresponding constellation diagram, that also includes separate inner positions, on an opposite side of the total amount of deviations of the signal levels;
   a signal point moving unit configured to move each position of each signal point of each of the target symbols outward; and
   a transmission unit configured to transmit a signal forming a modified transmission symbol string including the symbols, in which the positions of the signal points are moved outward, to the reception apparatus.

2. The transmission apparatus according to claim 1, wherein the target symbols are each independently specified for a signal of an In-phase and a signal of a Quadrature phase forming the unmodified transmission symbol string based on the total amount of deviations of the signal levels.

3. The transmission apparatus according to claim 1, wherein the target symbols are specified based on a combination of the total amount of deviations of the signal levels in a signal of an In-phase and a signal of a Quadrature phase forming the unmodified transmission symbol string, and the signal levels of the target symbols are changed so that the signal points move to maintain substantially the same phase on an I-Q plane of the corresponding constellation diagram.

4. The transmission apparatus according to claim 1, wherein the signal points of the target symbols are moved so that the movement does not cause the signal points of the target symbols to come close to boundaries with any points of any adjacent symbols on an I-Q plane at the reception apparatus.

5. The transmission apparatus according to claim 1, further comprising:
   a variation compensation unit configured to transform an output waveform of the signal forming the modified transmission symbol string based on variation models of a reference level in the reception apparatus caused by a coupling between the transmission apparatus and the reception apparatus.

6. The transmission apparatus according to claim 1, wherein the monitoring unit calculates an accumulated value of the signal levels from a top symbol in the signal forming the unmodified transmission symbol string.

7. The transmission apparatus according to claim 1, wherein the transmission unit is further configured to transmit the signal forming the modified transmission symbol string to the reception apparatus on a wireless frequency band.

8. A communication system, the communication system comprising:
   a reception apparatus and a transmission apparatus configured to communicate with the reception apparatus;
   the transmission apparatus comprising:
   a monitoring unit configured to monitor a total amount of deviations of signal levels in signals forming an unmodified transmission symbol string;
   a symbol specifying unit configured to specify target symbols from the unmodified transmission symbol string based on the total amount of deviations of the signal levels, and wherein each of the target symbols has a signal level at a position which is the outermost position of a corresponding constellation diagram, that also includes separate inner positions, on an opposite side of the total amount of deviations of the signal levels;
   a signal point moving unit configured to move each position of each signal point of each of the target symbols outward; and
   a transmission unit configured to transmit a signal forming a modified transmission symbol string including the symbols, in which the positions of the signal points are moved outward, to the reception apparatus; and
   the reception apparatus comprising:
   a reception unit configured to receive the signal forming the modified transmission symbol string from the transmission apparatus; and
   a determination unit configured to determine symbol values from the received signal based on predetermined determination boundaries.

9. A circuit apparatus including a circuit configured to generate a signal to be output to a subsequent stage through a coupling element, the circuit comprising:
   a monitoring unit configured to monitor a total amount of deviations of signal levels in signals forming an unmodified transmission symbol string;
   a symbol specifying unit configured to specify target symbols from the transmission symbol string based on the total amount of deviations of the signal levels, and wherein each of the target symbols has a signal level at a position which is the outermost position of a corresponding constellation diagram, that also includes separate inner positions, on an opposite side of the total amount of deviations of the signal levels;
   a signal point moving unit configured to move each position of each signal point of each of the target symbols outward; and
   an output unit configured to output a signal forming a modified transmission symbol string including the symbols, in which the positions of the signal points are moved outward, to the subsequent stage.

10. The circuit apparatus according to claim 9, wherein the subsequent stage of the circuit includes a wireless frequency band signal processing circuit that is configured to respectively receive In-phase and Quadrature phase signals forming the modified transmission symbol string, and is further configured to transmit the signal on a wireless frequency band.

11. A communication method executed by a transmission apparatus configured to communicate with a reception apparatus, the communication method comprising the steps of:
   by the transmission apparatus, acquiring a total amount of deviations of signal levels in signals forming an unmodified transmission symbol string;
   by the transmission apparatus, specifying target symbols from the unmodified transmission symbol string based on the total amount of deviations of the signal levels, and wherein each of the target symbols has a signal level at a position which is the outermost position of a corresponding constellation diagram, that also includes separate inner positions, on an opposite side of the total amount of deviations of the signal levels;

by the transmission apparatus, moving each position of each signal point of each of the target symbols outward; and by the transmission apparatus, transmitting a signal forming a modified transmission symbol string including the symbols, in which the positions of the signal points are moved outward, to the reception apparatus.

12. The communication method according to claim 11, further comprising the steps of:

by the transmission apparatus, resetting an accumulated value indicating the total amount of deviations of the signal levels in response to a top symbol among the symbols of the unmodified transmission symbol string;

by the transmission apparatus, acquiring the signal levels of the symbols of the unmodified transmission symbol string; and by the transmission apparatus, updating the accumulated value based on the acquired signal levels, wherein the step of specifying the target symbols further comprises the steps of:

by the transmission apparatus, determining the accumulated value indicating the total amount of deviations of the signal levels; and by the transmission apparatus, determining that symbols are the target symbols when the accumulated value satisfies a predetermined condition and when the signal levels of the symbols are at the outermost position opposite a sign of the total amount of deviations.

13. The communication method according to claim 11, wherein the step of specifying the target symbols and the step of moving positions of signal points of the target symbols are independently executed for a signal of an In-phase and a signal of a Quadrature phase forming the unmodified transmission symbol string.

14. The communication method according to claim 11, wherein in the step of specifying the target symbols, the target symbols are specified based on a combination of the total amount of deviations of the signal levels in a signal of an In-phase and a signal of a Quadrature phase forming the unmodified transmission symbol string, and in the step of moving, the signal levels of the target symbols are changed so that the signal points move to maintain substantially the same phase on an I-Q plane of the corresponding constellation diagram.

15. The communication method according to claim 11, further comprising:

before the step of transmission to the reception apparatus, a step of, by the transmission apparatus, transforming an output waveform of the signal forming the modified transmission symbol string to cancel variations of a reference level in the reception apparatus based on variation models of the reference level in the reception apparatus caused by a coupling with the reception apparatus.

16. A non-transitory computer program product for implementing a transmission apparatus configured to communicate with a reception apparatus, the computer program product comprising instructions for causing a programmable device to perform the steps of:

monitoring a total amount of deviations of signal levels in signals forming an unmodified transmission symbol string;

specifying target symbols from the unmodified transmission symbol string based on the total amount of deviations of the signal levels, and wherein each of the target symbols has a signal level at a position which is the outermost position of a corresponding constellation diagram, that also includes separate inner positions, on an opposite side of the total amount of deviations of the signal levels;

moving each position of each signal point of each of the target symbols outward; and outputting a signal forming a modified transmission symbol string including the symbols, in which the positions of the signal points are moved outward, to the reception apparatus.

* * * * *